United States Patent
Wright

(10) Patent No.: US 12,235,662 B2
(45) Date of Patent: Feb. 25, 2025

(54) MIXING VALVE SUBASSEMBLY AND WATER HEATER INCLUDING SAME

(71) Applicant: Rheem Manufacturing Company, Atlanta, GA (US)

(72) Inventor: Cameron Wright, Indianapolis, IN (US)

(73) Assignee: Rheem Manufacturing Company, Atlanta, GA (US)

( * ) Notice: Subject to any disclaimer, the term of this patent is extended or adjusted under 35 U.S.C. 154(b) by 461 days.

(21) Appl. No.: 17/510,972

(22) Filed: Oct. 26, 2021

(65) Prior Publication Data

US 2023/0129926 A1    Apr. 27, 2023

(51) Int. Cl.
| | |
|---|---|
| *G05D 23/13* | (2006.01) |
| *F16K 11/00* | (2006.01) |
| *F16K 11/24* | (2006.01) |
| *F16K 31/04* | (2006.01) |

(52) U.S. Cl.
CPC .......... *G05D 23/1393* (2013.01); *F16K 11/24* (2013.01); *F16K 19/00* (2013.01); *F16K 31/046* (2013.01)

(58) Field of Classification Search
CPC .... F16K 11/083; F16K 31/046; F16K 19/003; F16K 19/00; F16K 11/24; F16L 37/008; F16L 29/002; F16L 21/045; F16L 37/04; F16L 37/025; F16L 37/05; F16L 17/02; F16L 21/04; G05D 23/1393
See application file for complete search history.

(56) References Cited

U.S. PATENT DOCUMENTS

| | | | |
|---|---|---|---|
| 3,559,660 A | * | 2/1971 | Rollins ................... F16L 59/12 138/112 |
| 6,286,464 B1 | | 9/2001 | Abraham et al. |
| 10,082,301 B1 | * | 9/2018 | Shaffer ................... F24H 15/20 |
| 2008/0112843 A1 | * | 5/2008 | Peel ..................... G05D 23/1393 422/38 |
| 2016/0313029 A1 | * | 10/2016 | Ward ..................... F24H 15/215 |
| 2018/0052473 A1 | | 2/2018 | Ward et al. |
| 2020/0263397 A1 | * | 8/2020 | Wen ........................ E03B 7/075 |

OTHER PUBLICATIONS

International Search Report and Written Opinion of International Application No. PCT/US2022/044526 dated Dec. 21, 2022.

* cited by examiner

*Primary Examiner* — Schyler S Sanks

(74) *Attorney, Agent, or Firm* — Eversheds Sutherland (US) LLP

(57) ABSTRACT

A mixing valve assembly is disclosed. The mixing valve assembly can include a cold water connector, a hot water connector, an electronic valve system, and a tube. The cold water connector can have a through-hole configured to slideably receive at least a portion of a first tubular portion of a cold water inlet, and the hot water connector can have a through-hole configured to slideably receive at least a portion of a second tubular portion of a hot water outlet. The electronic valve system can be configured to transition a valve between an open configuration and a closed configuration such that cold water can be selectively permitted to flow from the cold water connector to the hot water connector. The mixing valve assembly can be configured to selectively permit cold water to bypass the tank of water heater.

17 Claims, 22 Drawing Sheets

MIXING VALVE SUBASSEMBLY AND WATER HEATER INCLUDING SAME

BACKGROUND

Water heating systems often include a mixing valve, which is a valve system configured to combine or mix heated or hot water with unheated or cold water. The mixing valve can provide several benefits including (i) ensuring a constant outlet water temperature despite variations in the temperature of the hot water in the water heating system's tank or the temperature of the cold water supply; (ii) permitting the water heating system to accommodate higher set or target temperatures, which can increase the effective system flow rate and/or prevent the growth of Legionella or other pathogens; (iii) reducing the size/heat output of the water heating system needed to accommodate peak system demands; (iv) effectively increasing the hot water supply (e.g., by heating water to a temperature higher than the end-use temperature and mixing the heated water stored in the tank with cold water, thereby using less volume from the tank); and/or (v) ensuring the heated water outputted by the water heating system is at a safe temperature (e.g., preventing scalding).

Traditionally, some mixing valves have used a wax pill thermostat for mixing and/or temperature regulation. However, it has become increasingly common for mixing valves to be electronically controlled. Regardless, many water heaters continue to be manufactured and sold without a mixing valve. Such water heater units must then be retrofitted with a mixing valve, such as with the example mixing valve 10 shown in FIGS. 1A and 1B, which is typically performed onsite by a plumber. Some water heater units are manufactured and sold with an integrated mixing valve, such as the mixing valve 20 shown in FIG. 1C. Regardless, existing mixing valves typically require the assembly of several components, such as a cold water fitting 12, a hot water fitting 14, a hose 16, and an actuator 18, which can be a mechanical actuator (e.g., a wax valve) as shown in FIGS. 1A and 1B or an electronic actuator (e.g., a stepper motor) as in FIG. 1C. Typically, these components are assembled together and installed onto the water heater unit via threaded connections, and this assembly work must be performed with wrenches, one component at a time.

Moreover, existing water heater units that are manufactured and sold with a mixing valve typically require a housing that is bulky and increases the overall product height of the water heater unit, which can increase the difficulty and cost of packaging and shipping and can also reduce the number of locations at which the water heater unit can be installed (e.g., due to height or space constraints at the intended installation location).

What is needed, therefore, are improved mixing valve systems and assemblies that can enable simplified and easier assembly and/or manufacturing processes and/or that can be packaged in a water heater unit with a smaller overall height or size. These and other problems are addressed by the technology disclosed herein.

SUMMARY

These and other problems are be addressed by the technologies described herein. Examples of the present disclosure relate generally to mixing valve systems and assemblies, water heater units including a mixing valve system, and methods for manufacturing a water heater unit including a mixing valve system.

The disclosed technology includes a mixing valve assembly (e.g., for a water heater). The mixing valve assembly can include a cold water connector, a hot water connector, an electronic valve system, and a tube such that the cold water connector, the electronic valve system, the tube, and the hot water connector are in fluid communication. The cold water connector can include a first through-hole configured to slideably receive at least a portion of a first tubular portion of a cold water inlet (e.g., a cold water inlet of the water heater). The hot water connector can include a second through-hole configured to slideably receive at least a portion of a second tubular portion of a hot water outlet (e.g., a hot water outlet of a water heater). The electronic valve system can be configured to transition a valve between an open configuration and a closed configuration.

The valve of the electronic valve system can be a solenoid valve. Alternatively or in addition, the electronic valve system can include a motor configured to transition the valve between the open configuration and the closed configuration.

The electronic valve system can be configured to receive instructions from a water heater controller of the water heater.

The mixing valve assembly can include a controller configured to output instructions to the electronic valve system. The controller can be configured to receive sensor data from one or more sensors of the water heater and determine to transition the valve between the open configuration and the closed configuration based at least in part on the sensor data. The controller can be configured to communicate with a water heater controller of the water heater.

The tube can be rigid. Alternatively, the tube can be non-rigid (e.g., flexible).

The mixing valve assembly can include a housing having the electronic valve system at least partially disposed therein. The housing can have a removeable portion (e.g., a top portion) that detachably attachable to another portion of the housing.

The mixing valve assembly can include a check valve configured to prevent backflow of water into the cold water connector.

The cold water connector can have a cold water inlet, a tank outlet axially aligned with the cold water inlet, and a mixing outlet. The first through-hole of the cold water connector can include the cold water inlet and the tank outlet such that the first tubular portion passes through the cold water inlet and the tank outlet. The hot water connector can have a hot water inlet, a mixing inlet, and an outlet axially aligned with the hot water inlet. The second through-hole of the hot water connector can include the hot water inlet and the outlet such that the second tubular portion passes through the hot water inlet and the outlet.

The disclosed technology includes a water heater. The water heater can include a tank and mixing valve assembly attached to the tank. The tank can have an inlet and an outlet. A first tubular portion can be connected to the inlet of the tank, and the first tubular portion can have one or more apertures in a sidewall of the first tubular portion. A second tubular portion can be connected to the outlet of the tank, and the second tubular portion can have one or more apertures in a sidewall of the second tubular portion. The mixing valve assembly can include a first connector, a second connector, an electronic valve system, and a tube. The first connector can have a first through-hole configured to slideably receive at least a portion of the first tubular portion, and the second connector can have a second through-hole configured to slideably receive at least a portion of the second tubular portion.

At least some of the first connector, at least some of the second connector, and the tube can be disposed within an outer shell of the water heater. The mixing valve assembly can be disposed within the outer shell of the water heater. For example, all of the mixing valve assembly can be disposed within the outer shell of the water heater.

The water heater can include a water heater controller, and the water heater controller can be in electronic communication with the electronic valve system of the mixing valve assembly. Alternatively or in addition, the mixing valve assembly can include a controller, and the water heater controller can be in electronic communication with the controller of the mixing valve assembly.

The disclosed technology includes a method for installing a mixing valve assembly on a water heater. The method can include sliding a cold water connector of the mixing valve assembly onto a first tubular portion of a cold water inlet of a water heater tank. The first tubular portion can include one or more apertures in a sidewall of the first tubular portion. The method can include sliding a hot water connector of the mixing valve assembly onto a second tubular portion of a hot water outlet of the water heater tank. The second tubular portion can include one or more apertures in a sidewall of the second tubular portion. The hot water connector can be fluidly connected to the cold water connector via at least a tube and an electronic valve system. The method can include installing a jacket around at least a portion of the water heater tank and attaching a top plate to the jacket.

Further features of the disclosed design, and the advantages offered thereby, are explained in greater detail hereinafter with reference to specific examples illustrated in the accompanying drawings, wherein like elements are indicated be like reference designators.

BRIEF DESCRIPTION OF THE DRAWINGS

Reference will now be made to the accompanying drawings, which are not necessarily drawn to scale. The drawings are incorporated into and constitute a portion of this disclosure, illustrating various implementations and aspects of the disclosed technology. Together with the description, the drawings serve to explain the principles of the disclosed technology.

DETAILED DESCRIPTION

Figure 1A:
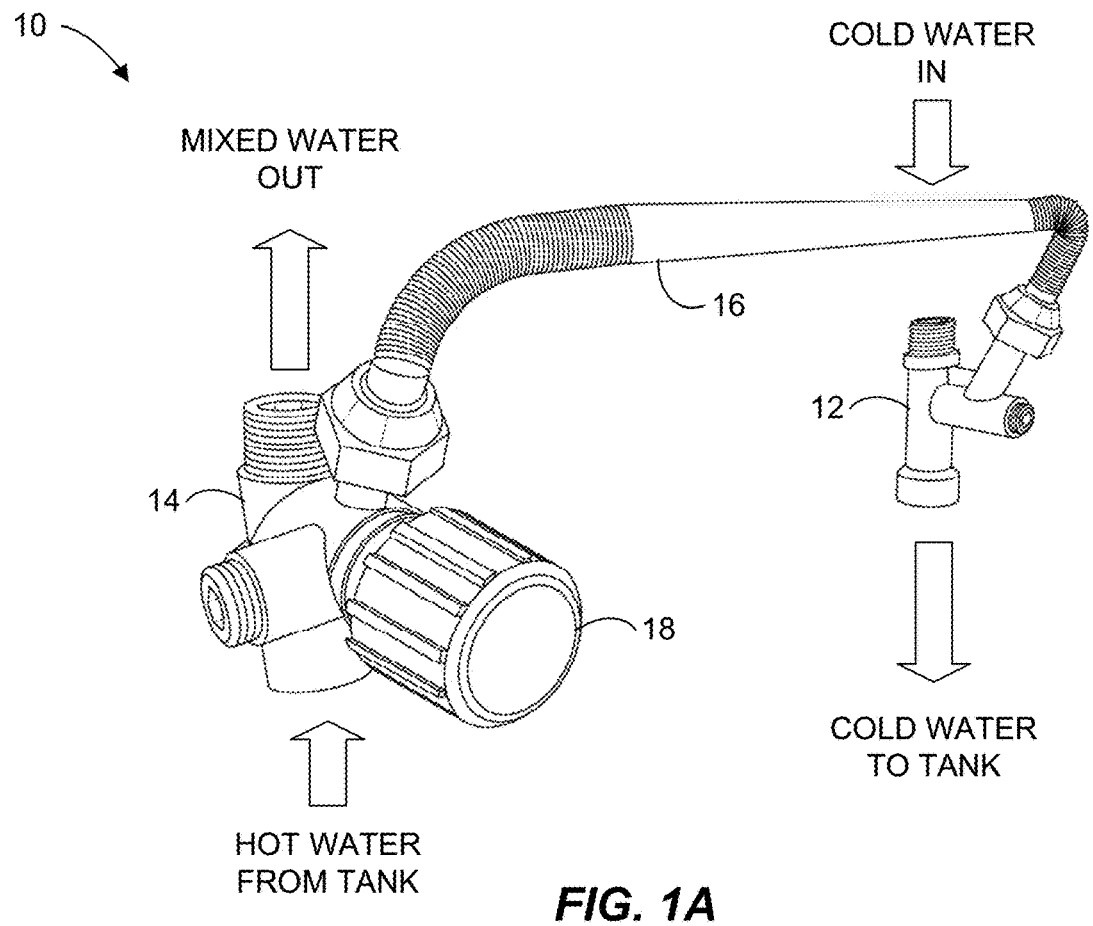
FIGS. 1A and 1B illustrate a prior art mixing valve.
Figure 1B:
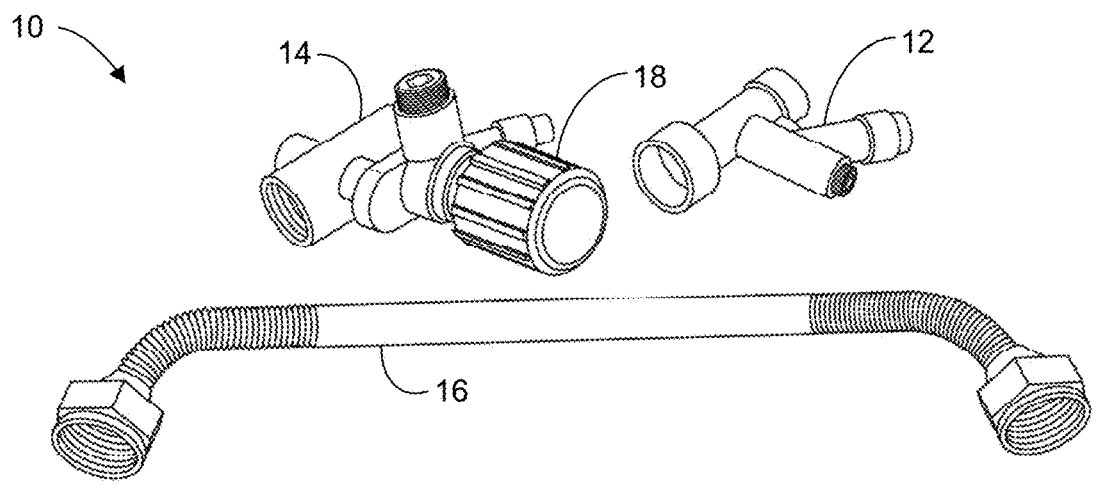
Figure 1C:
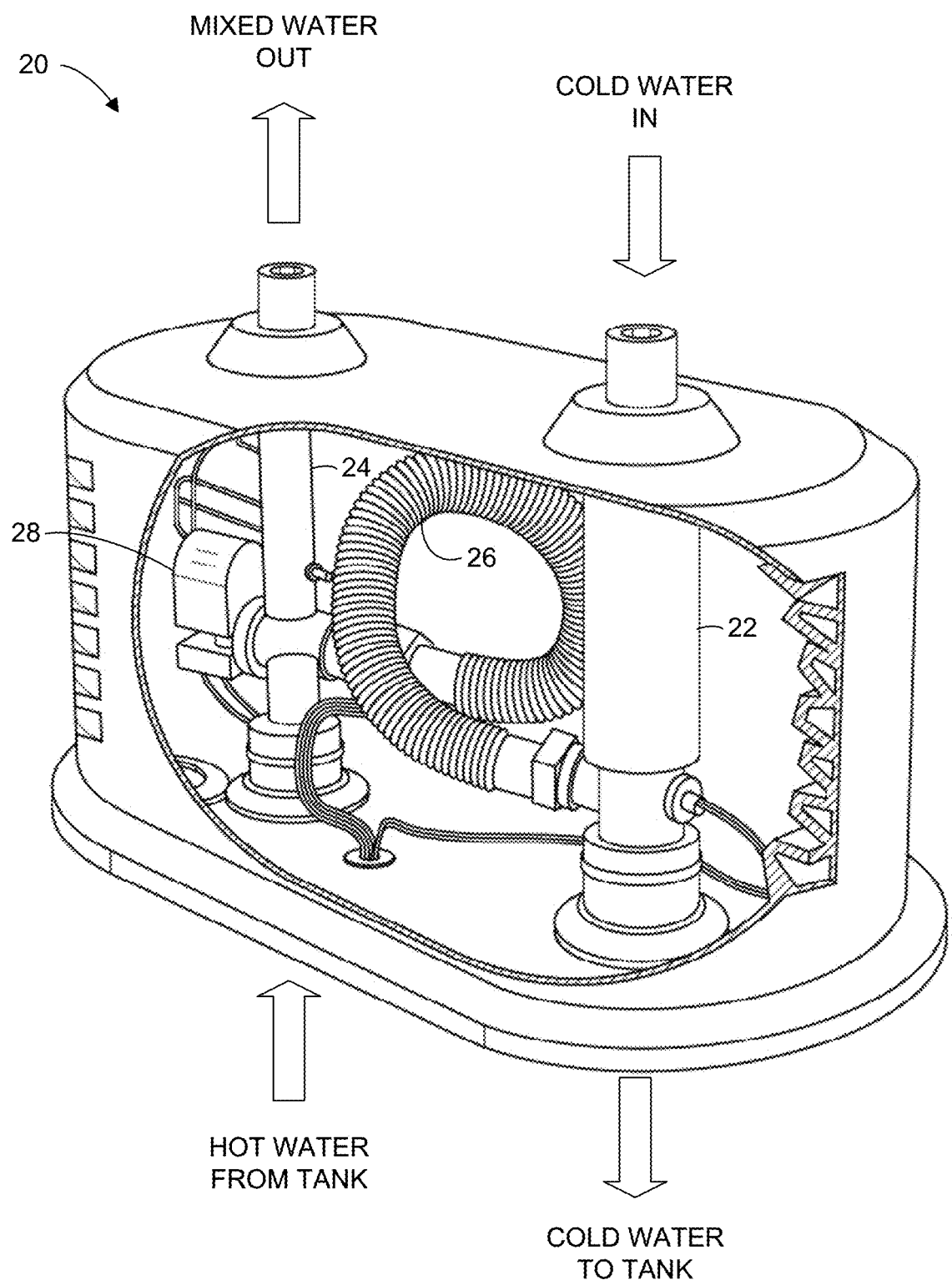
FIG. 1C illustrates another prior art mixing valve.
Figure 2:
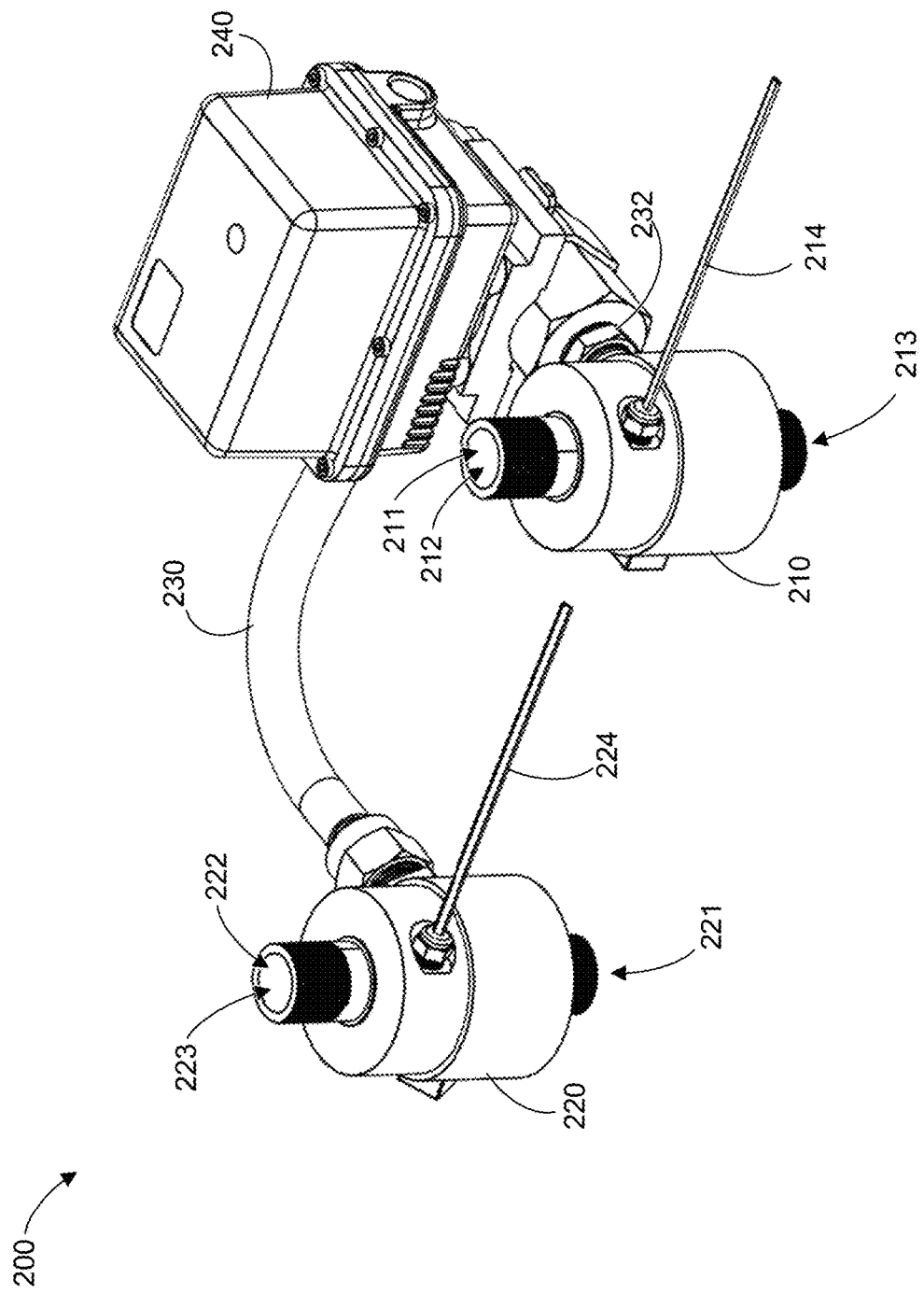
FIG. 2 illustrates a perspective view of an example mixing valve assembly, in accordance with the disclosed technology.
Figure 3:
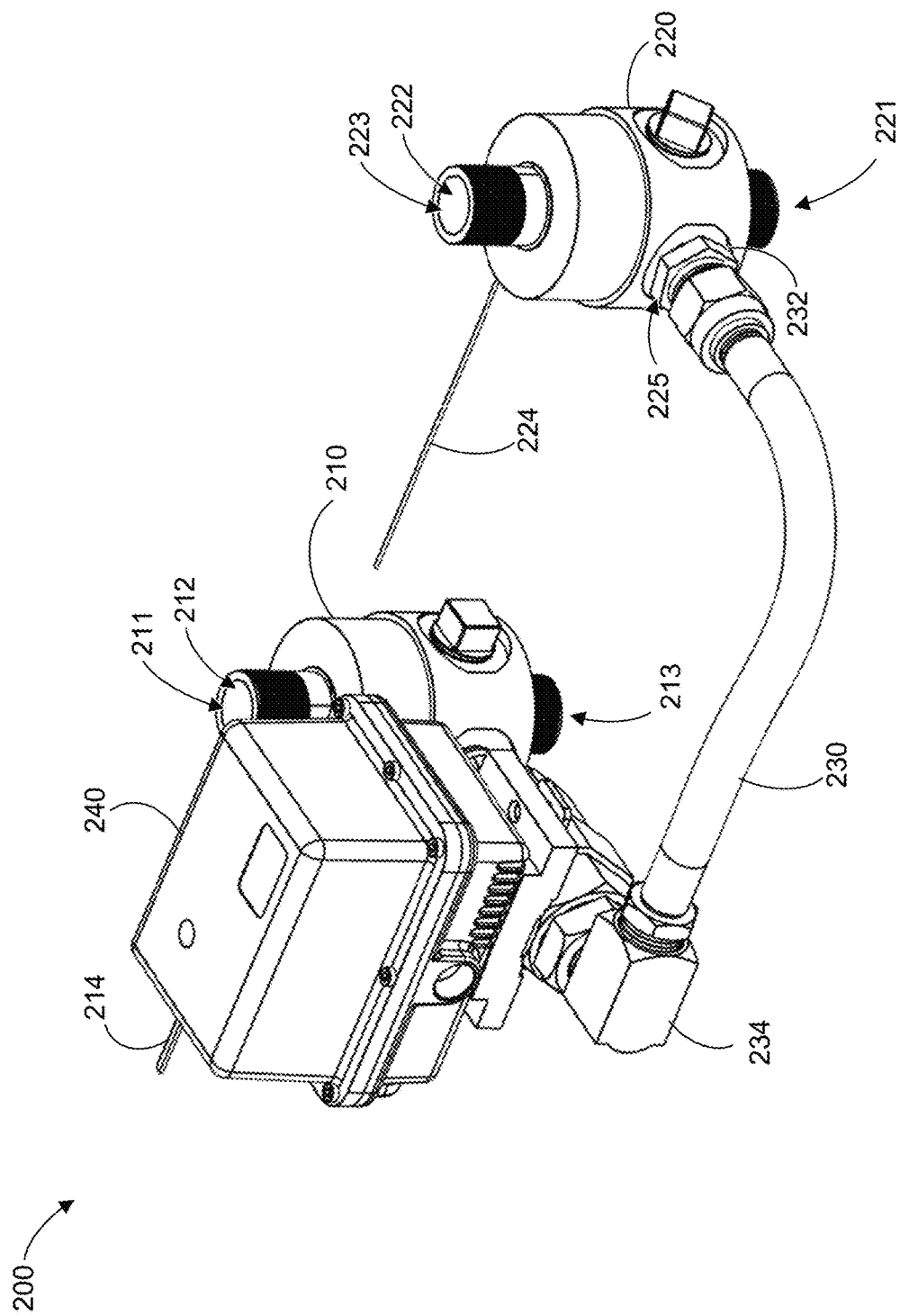
FIG. 3 illustrates another perspective view of an example mixing valve assembly, in accordance with the disclosed technology.
Figure 4:
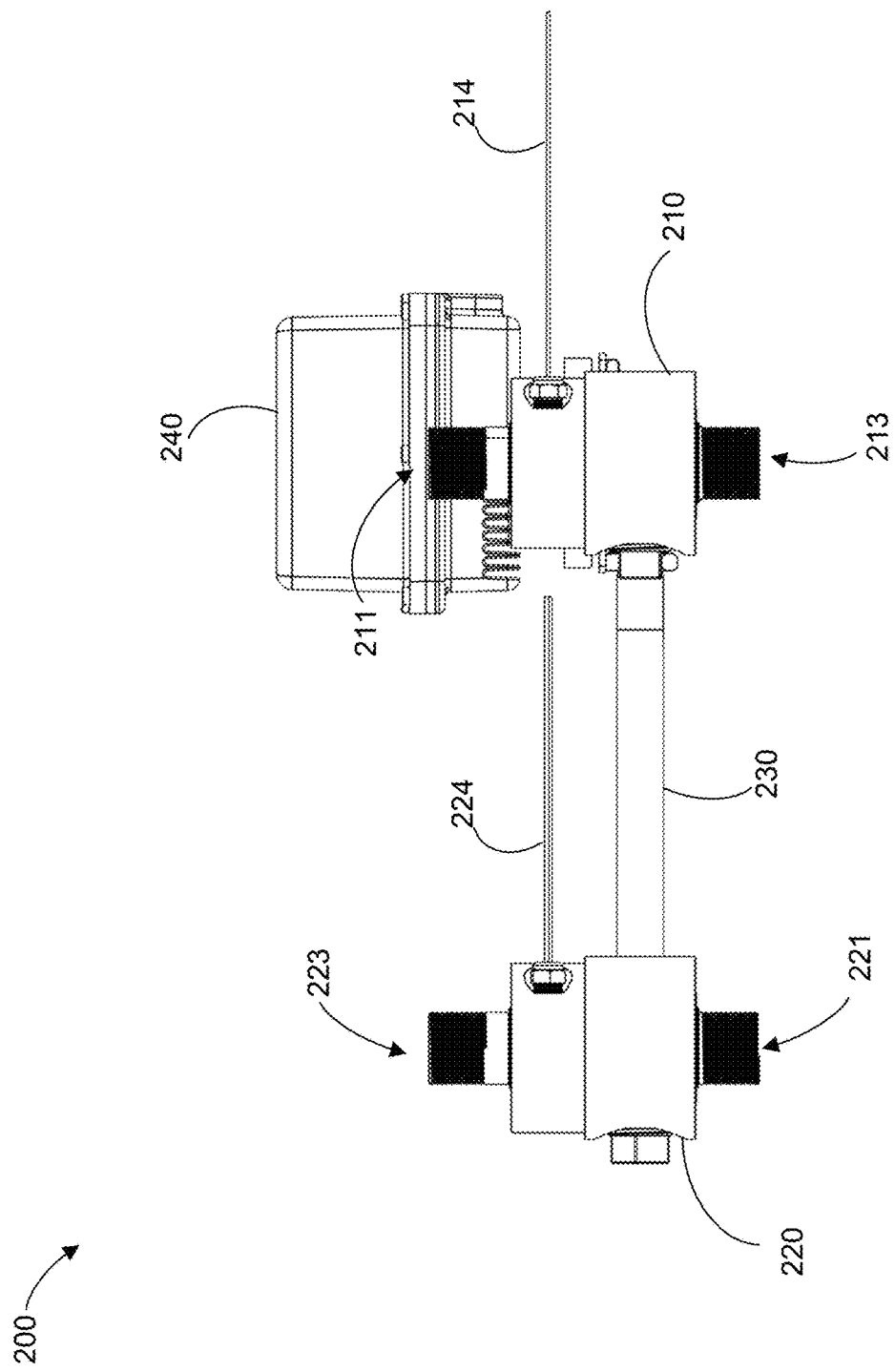
FIG. 4 illustrates a front view of an example mixing valve assembly, in accordance with the disclosed technology.
Figure 5:
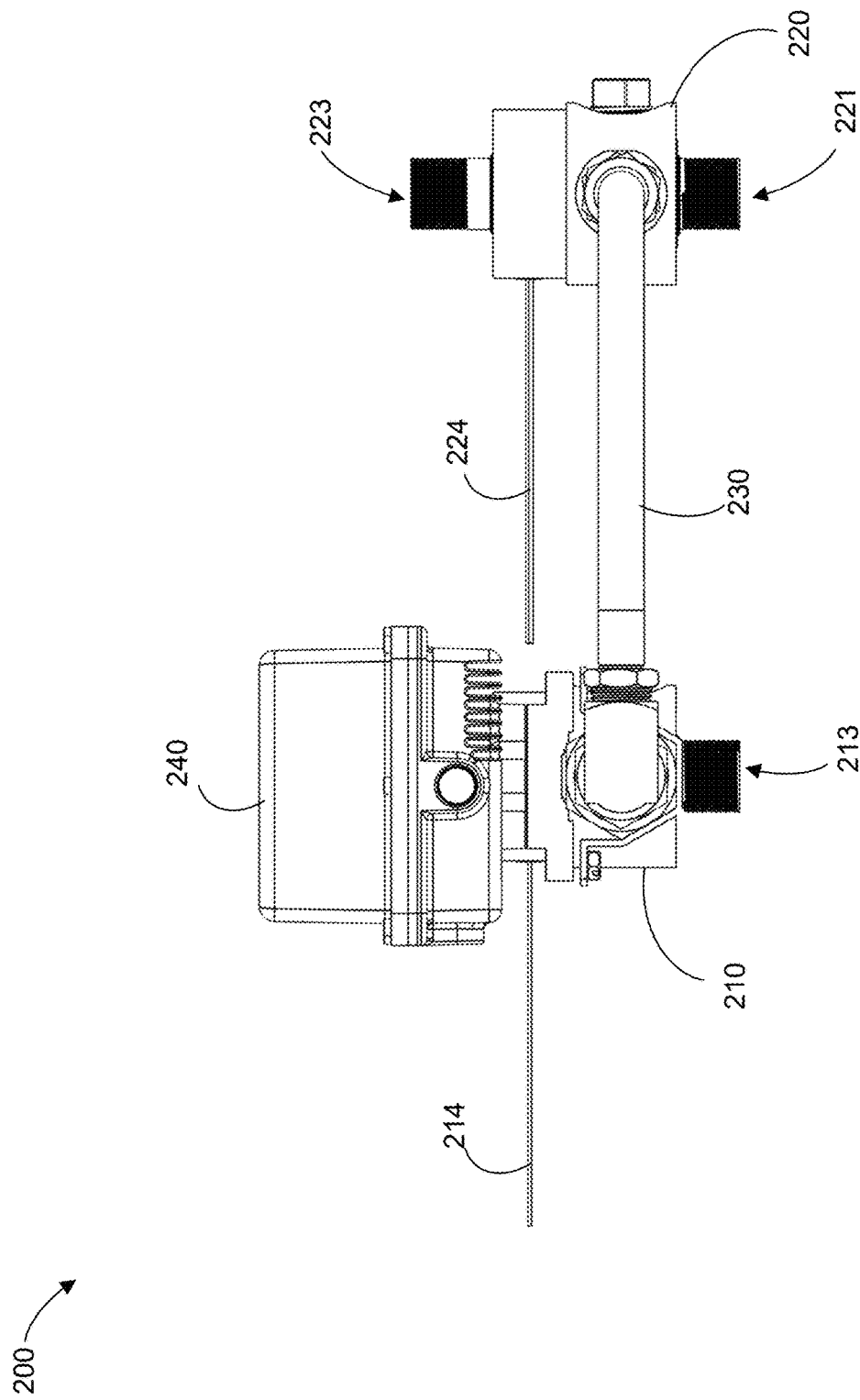
FIG. 5 illustrates a back view of an example mixing valve assembly, in accordance with the disclosed technology.
Figure 6:
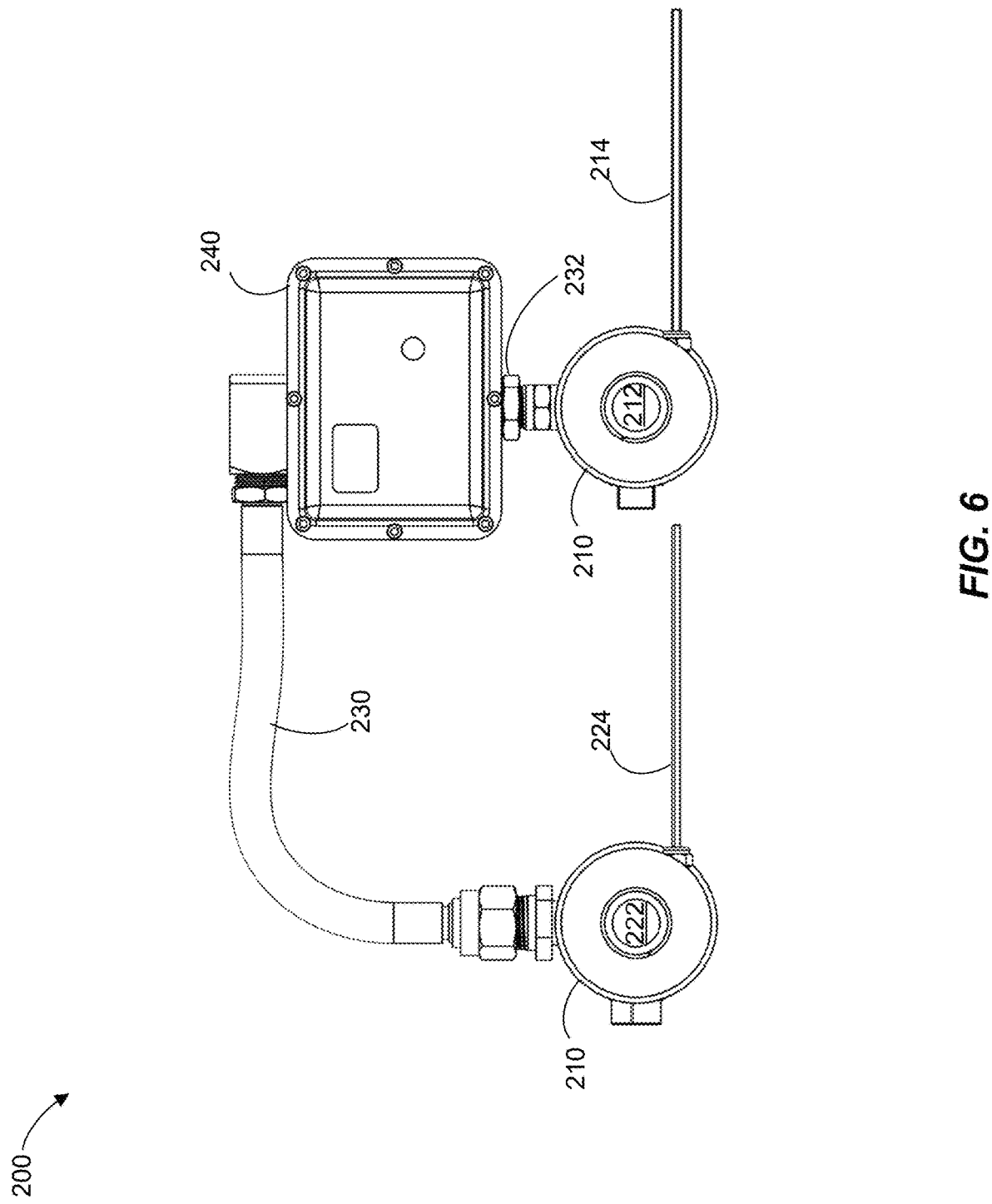
FIG. 6 illustrates a top view of an example mixing valve assembly, in accordance with the disclosed technology.
Figure 7:
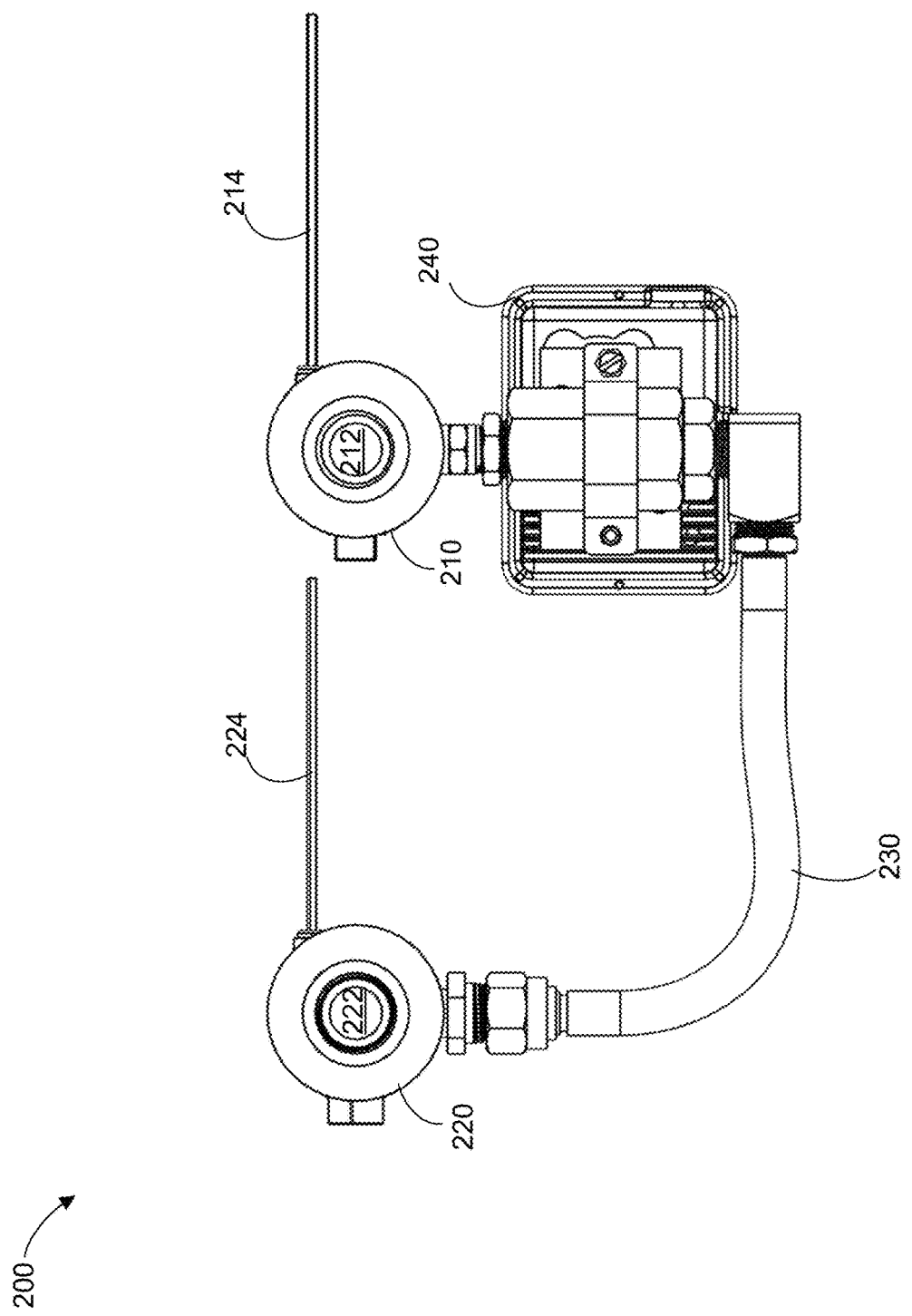
FIG. 7 illustrates a bottom view of an example mixing valve assembly, in accordance with the disclosed technology.
Figure 8:
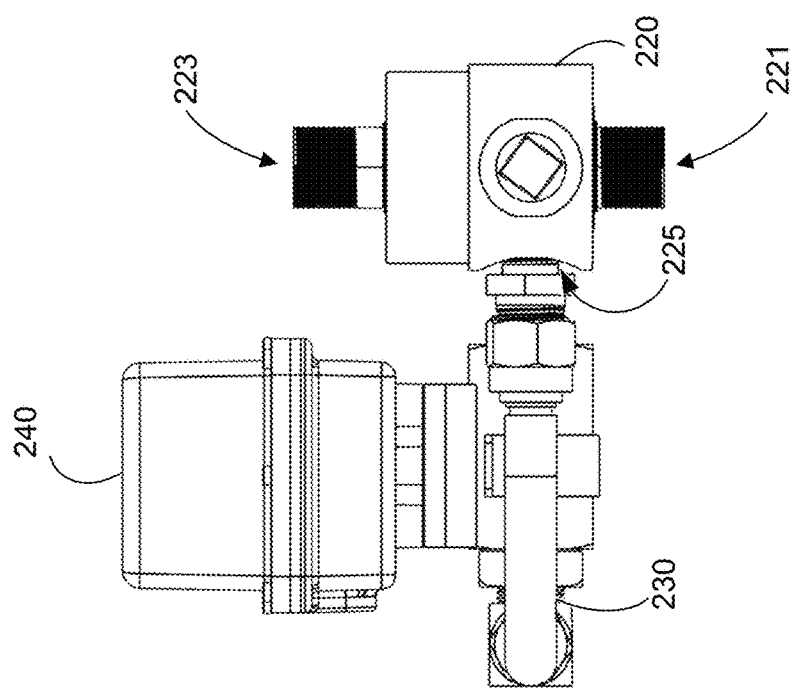
FIG. 8 illustrates a left view of an example mixing valve assembly, in accordance with the disclosed technology.
Figure 9:
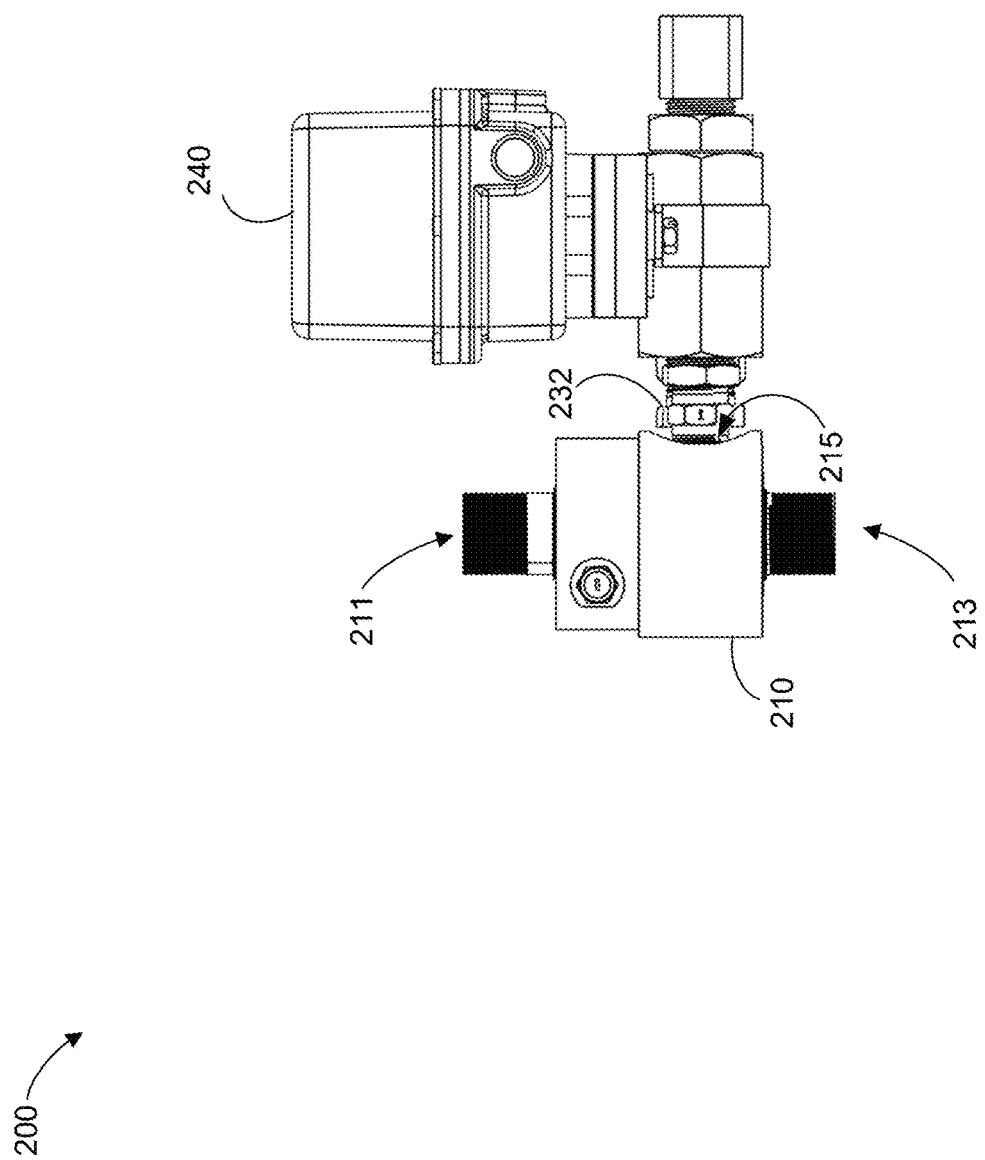
FIG. 9 illustrates a right view of an example mixing valve assembly, in accordance with the disclosed technology.
Figure 10:
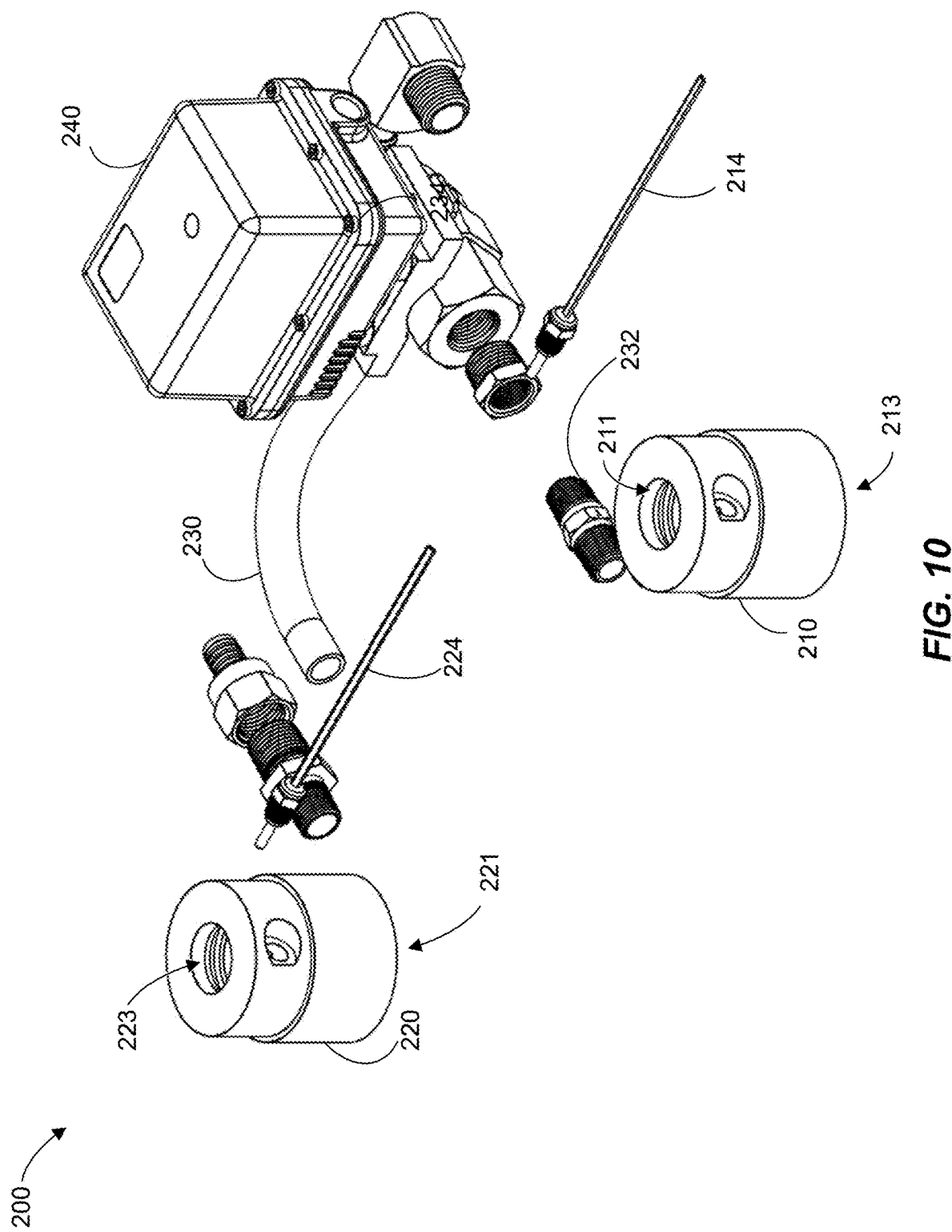
FIG. 10 illustrates an exploded view of an example mixing valve assembly, in accordance with the disclosed technology.

Throughout this disclosure, systems and methods are described with respect to mixing valve systems and assemblies and water heater units including a mixing valve system. Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

Unless otherwise specified, all ranges disclosed herein are inclusive of stated end points, as well as all intermediate values. By way of example, a range described as being "from approximately 2 to approximately 4" includes the values 2 and 4 and all intermediate values within the range. Likewise, the expression that a property "can be in a range from approximately 2 to approximately 4" (or "can be in a range from 2 to 4") means that the property can be approximately 2, can be approximately 4, or can be any value therebetween. Further, the expression that a property "can be between approximately 2 and approximately 4" is also inclusive of the endpoints, meaning that the property can be approximately 2, can be approximately 4, or can be any value therebetween.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, unless otherwise specified, the use of the ordinal adjectives "first," "second," "third," etc., to describe a common object, merely indicate that different instances of like objects are being referenced and are not intended to imply that the objects so described must be in a given sequence, either temporally, spatially, in ranking, or in any other manner.

Although the disclosed technology may be described herein with respect to various systems and methods, it is contemplated that embodiments or implementations of the disclosed technology with identical or substantially similar features may alternatively be implemented as methods or systems. For example, any aspects, elements, features, or the like described herein with respect to a method can be equally attributable to a system. As another example, any aspects, elements, features, or the like described herein with respect to a system can be equally attributable to a method.

Reference will now be made in detail to examples of the disclosed technology that are illustrated in the accompanying drawings and disclosed herein. Wherever convenient, the same reference numbers will be used throughout the drawings to refer to the same or like parts.

Referring in particular to FIGS. 2-13, the disclosed technology includes a mixing valve assembly 200, which can include a cold water connector 210 and a hot water connector 220. As will be described in more detail herein, the cold water connector 210 can be configured to fluidly connect to a cold water inlet of a water heater (e.g., water heater 300 as described more fully herein), and the hot water connector 220 can be configured to fluidly connect to a hot water outlet of a water heater. The cold water connector 210 can be in fluid communication with the hot water connector 220 such that cold (i.e., unheated) water can be combined with hot (i.e., heated) water from the water heater, thereby providing mixed water having a temperature less than the temperature of the hot water from the water heater. The cold water connector 210 and hot water connector 220 can be fluidly connected by a hose 230, one or more check valves 232, and/or a fluid passage of a housing 240. Optionally, additional components, nipples, fittings, and the like can be included to provide a desired configuration. For example, referring specifically to FIGS. 3 and 11, an elbow fitting 234 can connect the hose 230 to the water passage of the housing 240 and/or other nipples, fittings, and the like can be used to connect the various components together to form a fluid passageway between the cold water connector 210 and the hot water connector 220.

Figure 11:
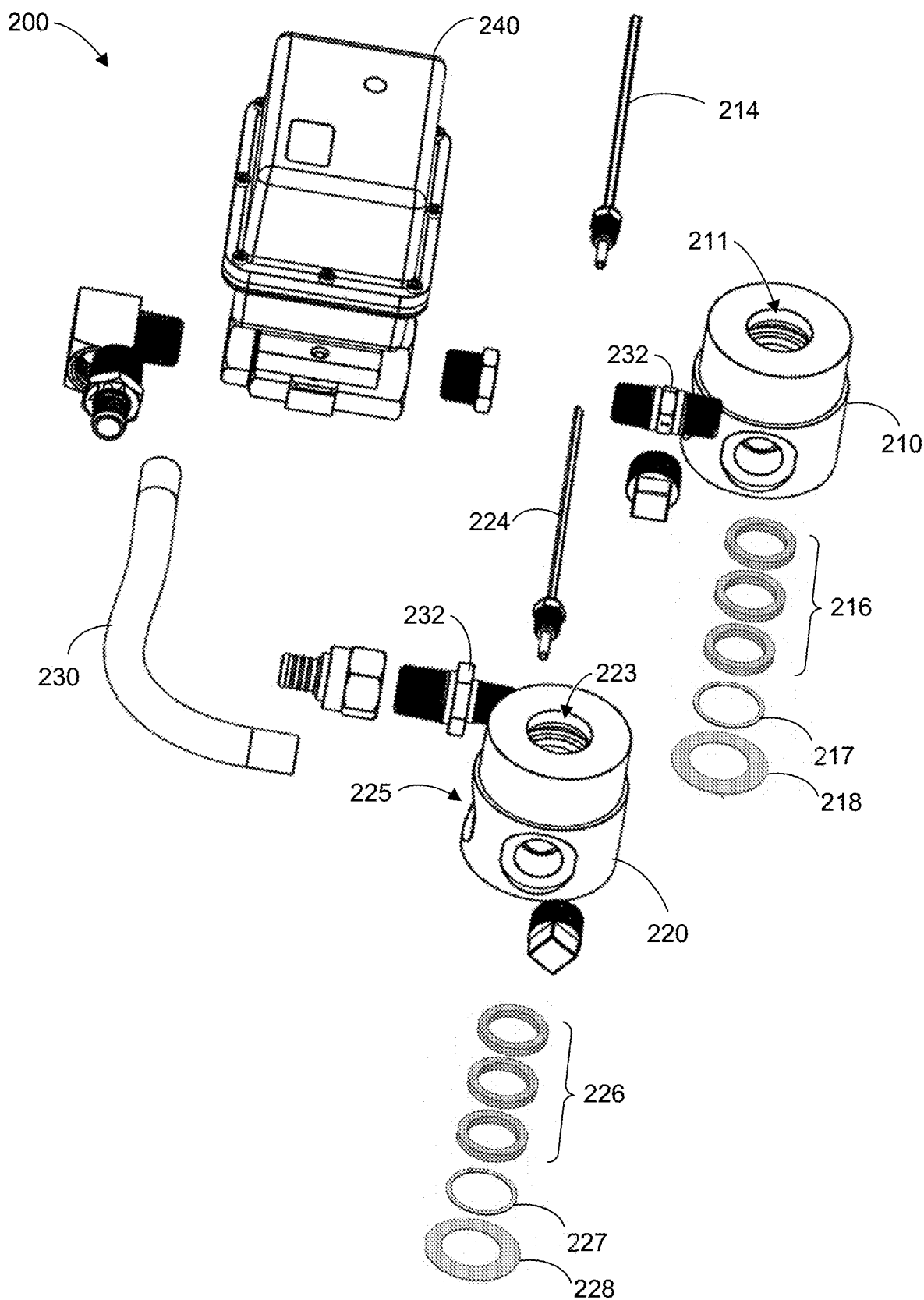
FIG. 11 illustrates another exploded view of an example mixing valve assembly, in accordance with the disclosed technology.
Figure 12:
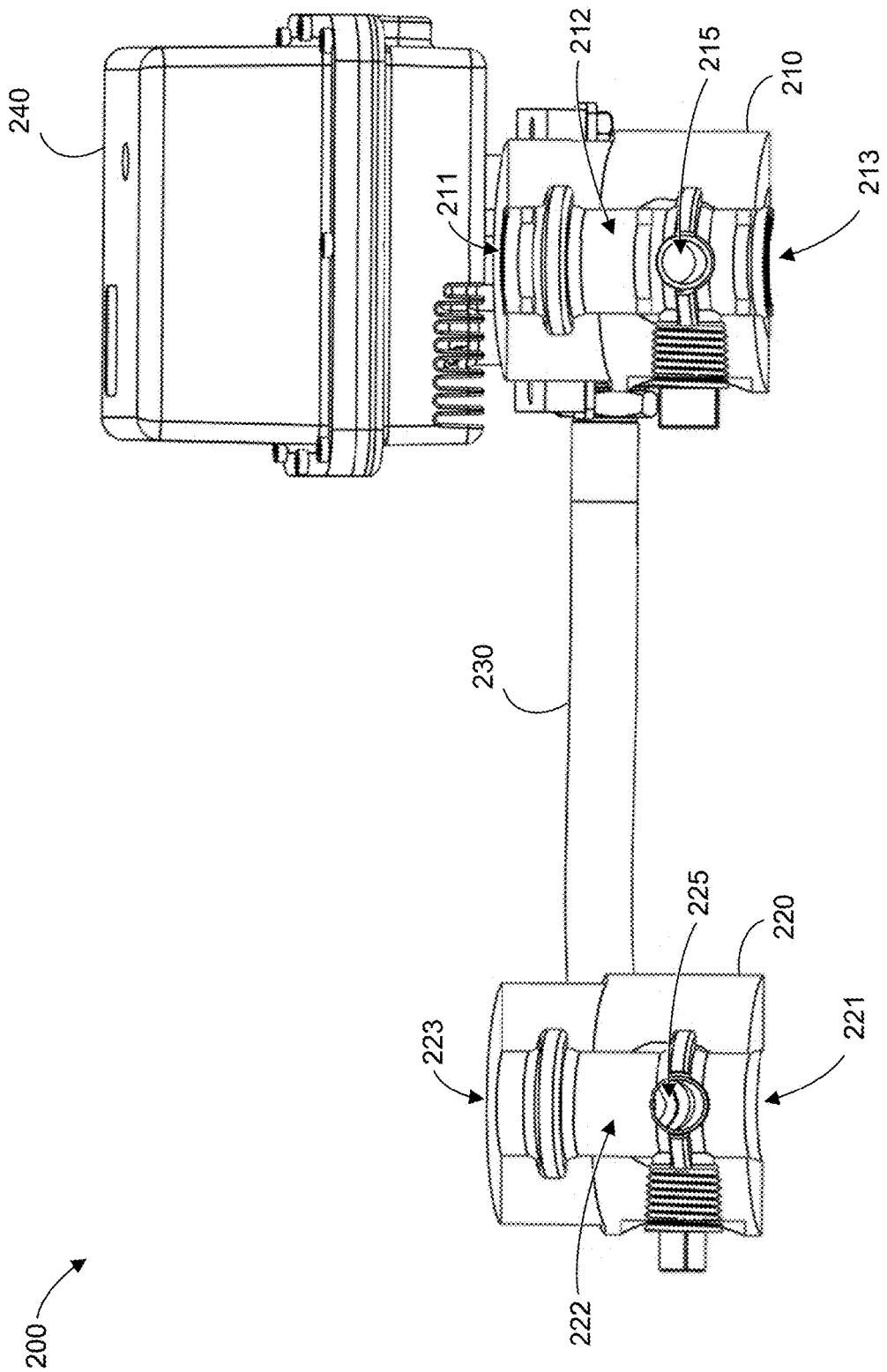
FIG. 12 illustrates a cross-sectional view of an example mixing valve assembly, in accordance with the disclosed technology.

The cold water connector 210 can include a body and an aperture or through-hole 212. As will be described more fully herein, the through-hole 212 can be configured to slidably receive a cold water inlet tube of a water heater. As a non-limiting example, the cold water inlet tube can be or include a heat trap. Thus, the cold water connector 210 can be or include a slip tee configured to slidably engage the cold water inlet tube. Optionally, the cold water connector 210 can include additional components, such as the illustrated temperature sensor 214 (e.g., to measure the temperature of water inside the through-hole 212. As shown in FIG. 11, the hot water connector 220 can optionally include one or more seals 216 (e.g., O-rings) inside the through-hole 212. Alternatively or in addition, the seal(s) can be disposed on the tubular portion of the cold water inlet of the water heater. The cold water connector 210 can include one or more snap rings 217 and/or one or more washers 218. The snap rings 217 can be used to connect one or more components or elements of the cold water connector 210 (and/or mixing valve assembly 200). However, the disclosed technology is not so limited. For example, alternatively or in addition, components or elements of the mixing valve assembly 200 (e.g., the cold water connector 210) can be connected via an open sided clip retained by a bolt or a snap fit connection between components.

Stated otherwise, the cold water connector 210 can have an inlet 211, a tank outlet 213, and a mixing outlet 215. The inlet 211 and the tank outlet 213 can be axially aligned, thereby forming the through-hole 212. A volume can be defined by the body of the cold water connector 210 and can extend between the inlet 211 and the tank outlet 213. The mixing outlet 215 can fluidly communicate (e.g., be in direct fluid communication with) the internal volume of the cold water connector 210, and the mixing outlet 215 can have an axis that intersects the axes of the inlet 211 and the tank outlet 213. Accordingly, cold water can be permitted to flow from a cold water source, into the cold water connector 210 via the inlet 211, and out of the of the cold water connector 210 via the tank outlet 213 to the tank of a water heater. In addition, cold water can be permitted to flow from the cold water source, into the cold water connector 210 via the inlet 211, and out of the of the cold water connector 210 via the mixing outlet 215 toward the hot water outlet of the water heater.

Cold water exiting the cold water connector 210 via the mixing outlet can pass through a check valve 232, which can prevent cold water from backflowing into the cold water connector 210 through the mixing outlet. Cold water can continue to flow from the check valve 232 through an electronic valve system 260. Optionally, the electronic valve system can be located within housing 240. The electronic valve system 260 can include a motor 262 configured to transition a valve 264 between an open configuration and a closed configuration. The motor 262 can be or include a stepper motor any other type of motor. The valve 264 can be or include a flap valve, a ball valve, or any other type of valve. Alternatively or in addition, the valve 264 can be a solenoid valve, in which case the motor 262 can be omitted. When the valve 264 is in the open configuration (which corresponds to active mixing of cold and hot water), cold water can be permitted to flow through the valve 264, through the hose 230, and into the hot water connector 220.

Optionally, a check valve 232 can be included between the hose 230 and the hot water connector 220 (e.g., in addition to or in place of a check valve 232 proximate the mixing outlet of the cold water connector 210).

The hot water connector 220 can include a body and an aperture or through-hole 222. As will be described more fully herein, the through-hole 222 can be configured to slidably receive a hot water outlet tube of a water heater. As a non-limiting example, the hot water outlet tube can be or include a heat trap. Thus, the hot water connector 220 can be or include a slip tee configured to slidably engage the hot water outlet tube. Optionally, the hot water connector 220 can include additional components, such as the illustrated temperature sensor 224 (e.g., to measure the temperature of water inside the through-hole 222. As shown in FIG. 11, the hot water connector 220 can optionally include one or more seals 226 (e.g., O-rings) inside the through-hole 222. Alternatively or in addition, the seal(s) can be disposed on the tubular portion of the hot water outlet of the water heater. The cold water connector 210 can include one or more snap rings 217 and/or one or more washers 218. The snap rings 217 can be used to connect one or more components or elements of the cold water connector 210 (and/or mixing valve assembly 200). However, the disclosed technology is not so limited. For example, alternatively or in addition, components or elements of the mixing valve assembly 200 (e.g., the cold water connector 210) can be connected via an open sided clip retained by a bolt or a snap fit connection between components.

Stated otherwise, the hot water connector 220 can have a hot water inlet 221, an outlet 223, and a mixing inlet 225. The hot water inlet 221 and the outlet 223 can be axially aligned, thereby forming the through-hole 222. A volume can be defined by the body of the hot water connector 220 and can extend between the hot water inlet 221 and the outlet 223. The mixing inlet 225 can fluidly communicate (e.g., be in direct fluid communication with) the volume of the hot water connector 220, and the mixing inlet 225 can have an axis that intersects the axes of the hot water inlet 221 and the outlet 223. Accordingly, hot water can be permitted to flow from the tank of the water heater, into the hot water connector 220 via the hot water inlet 221, and out of the of the hot water connector 220 via the outlet 223. In addition, cold water can be permitted to flow from the hose 230, into the hot water connector 220 via the mixing inlet 225 to mix cold water from the cold water source with hot water from the tank of the water heater, such that mixed water can flow out of the outlet 223 of the hot water connector 220.

The hose 230 can comprise a rigid material (e.g., metal, a hard plastic such as PVC. Accordingly, the distance between the cold water connector 210 and the hot water connector 220 can be predetermined. Alternatively, the hose 230 can comprise a flexible material (e.g., a non-rigid plastic), such as PEX pipe or tubing. This can enable the distance between the cold water connector 210 and the hot water connector 220 to be variable, which can enable the mixing valve assembly 200 to be installable of multiple models of water heaters.

Figure 13:
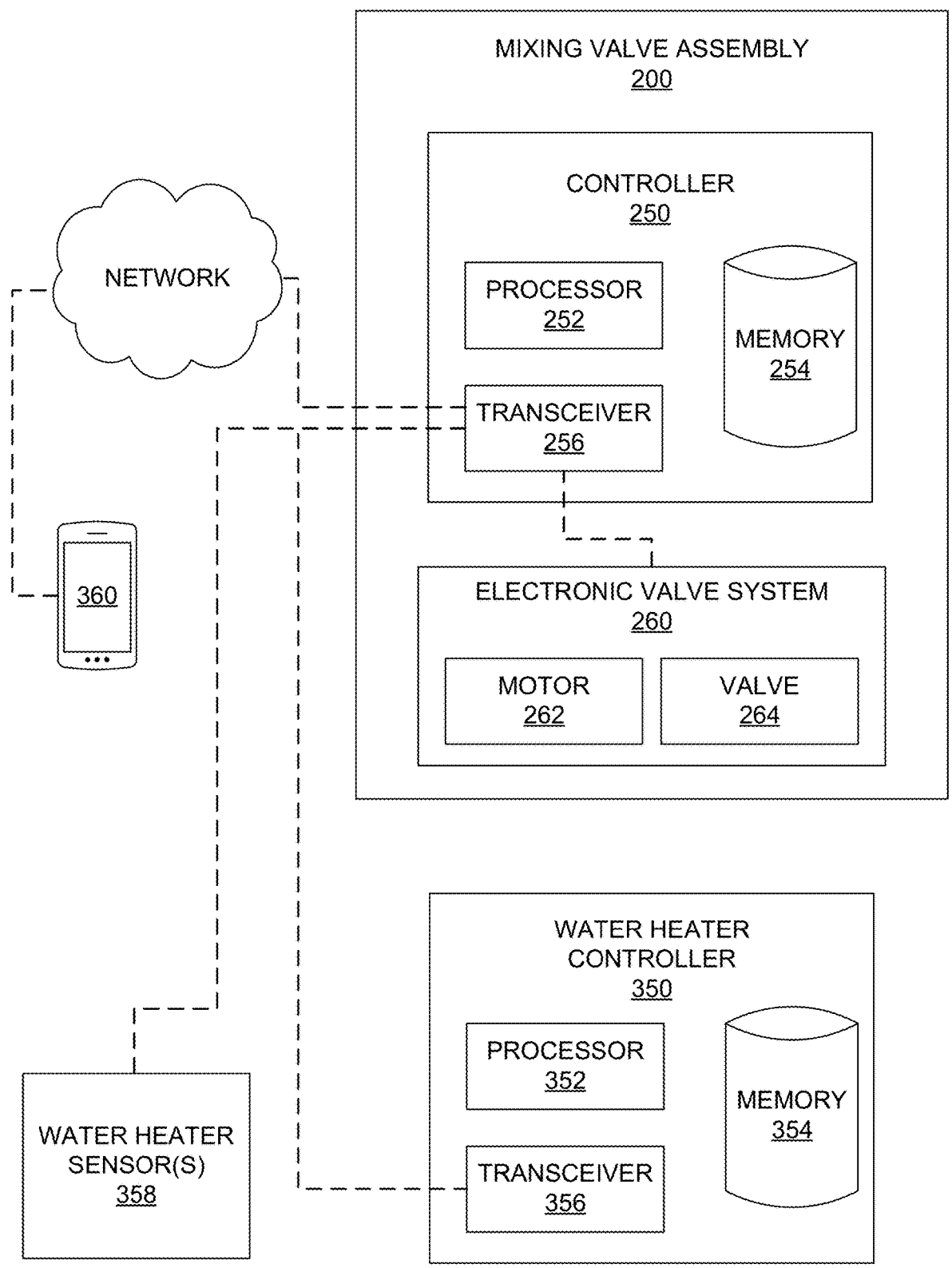
FIG. 13 illustrates a schematic diagram of an example controller for a mixing valve assembly, in accordance with the disclosed technology.
Figure 14:
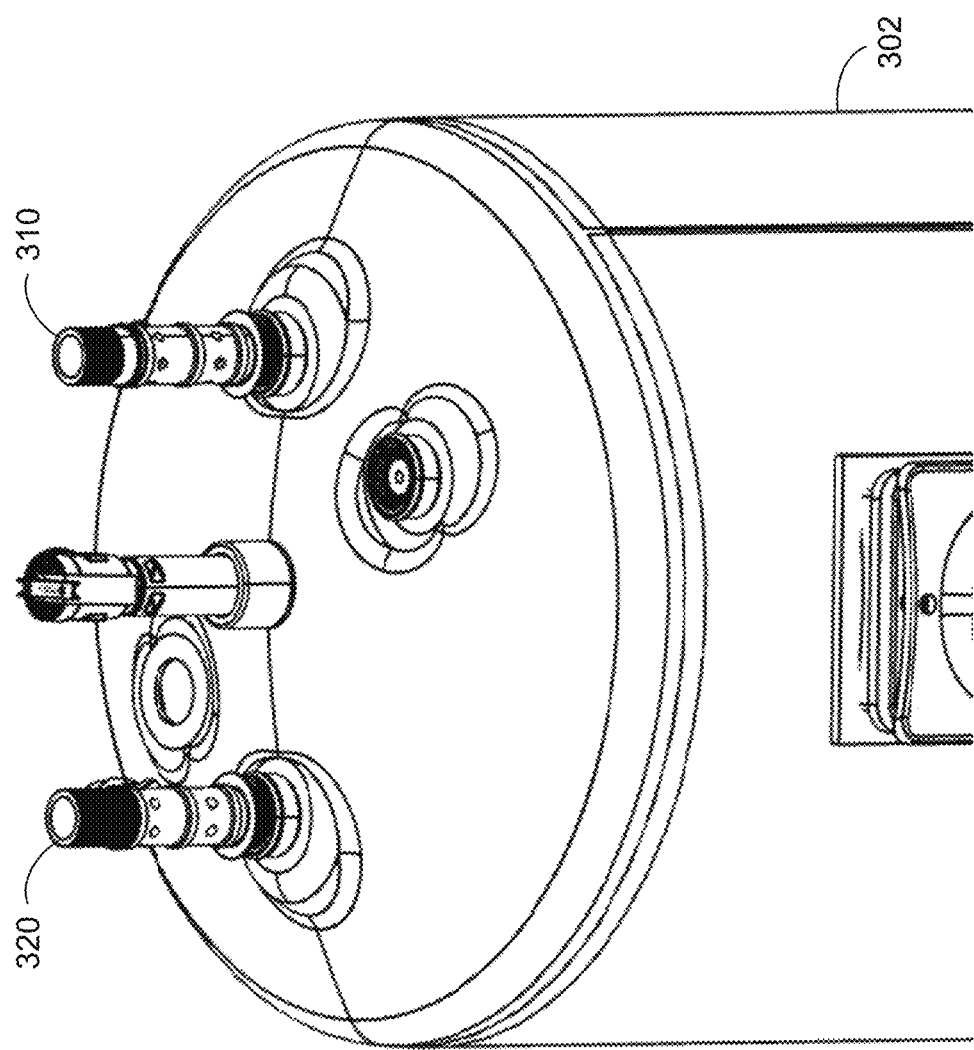
FIG. 14 illustrates a tank of a water heater unit, in accordance with the disclosed technology.
Figure 15:
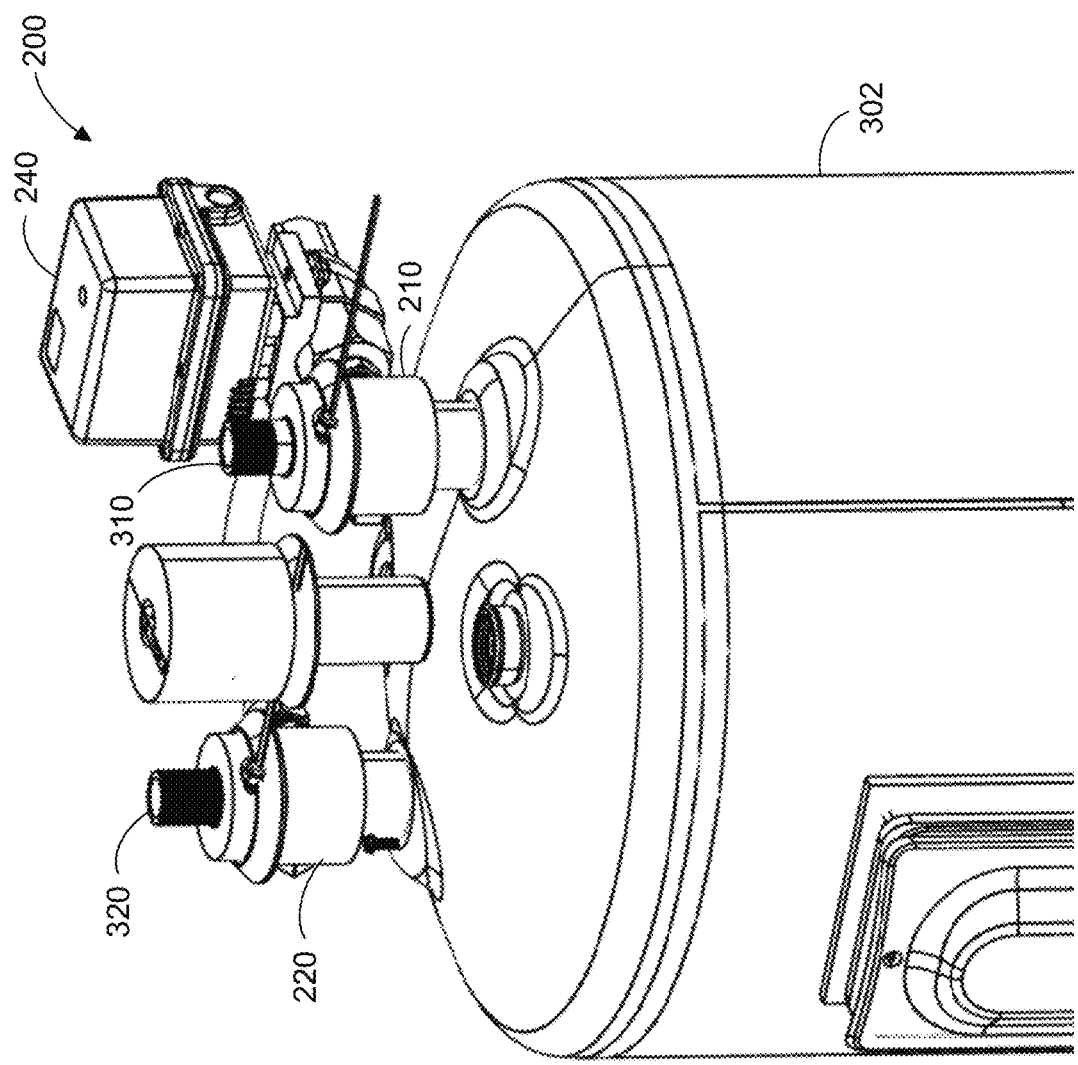
FIG. 15 illustrates an example mixing valve assembly installed on a tank of a water heater unit, in accordance with the disclosed technology.
Figure 16:
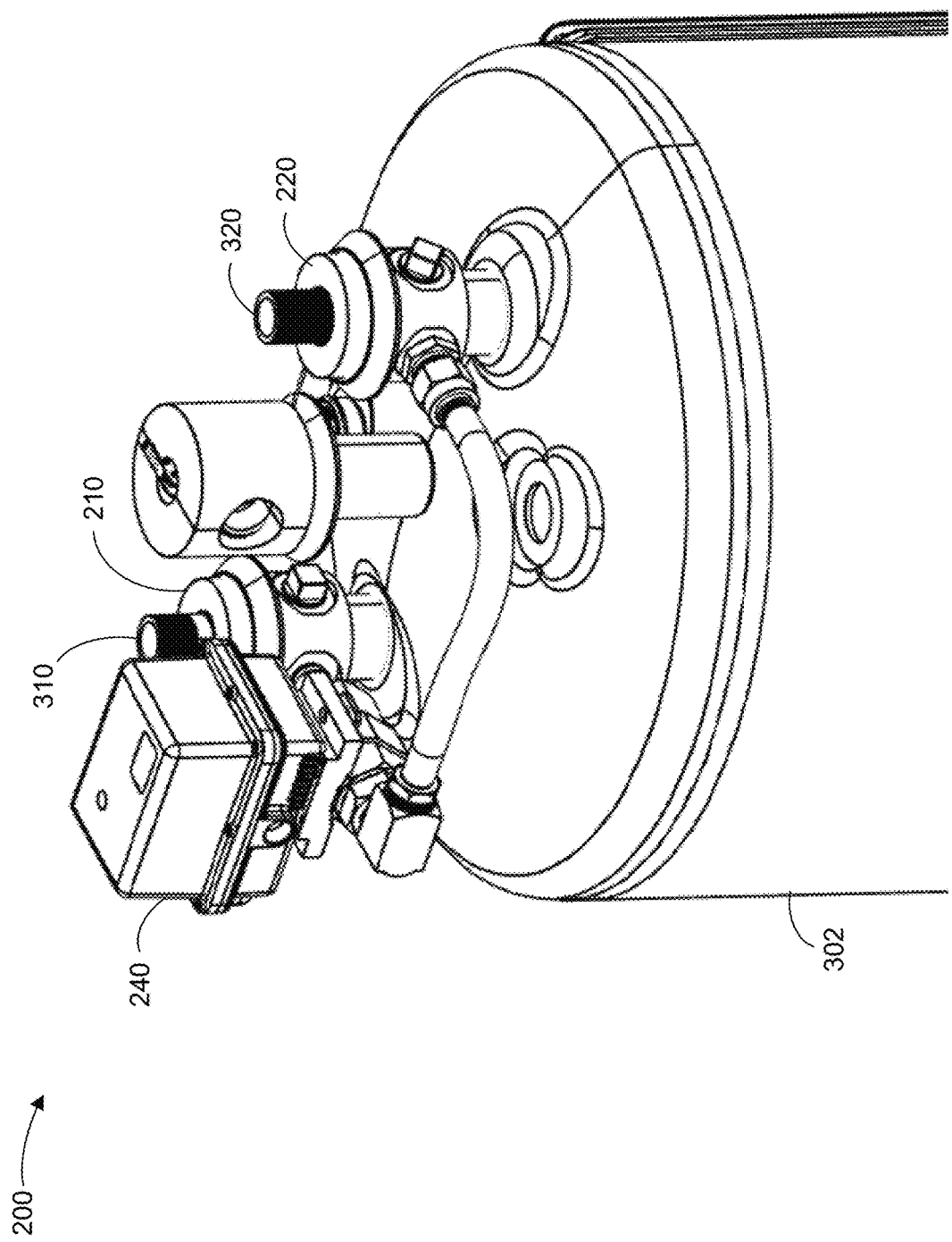
FIG. 16 illustrates another view of an example mixing valve assembly installed on a tank of a water heater unit, in accordance with the disclosed technology.
Figure 17:
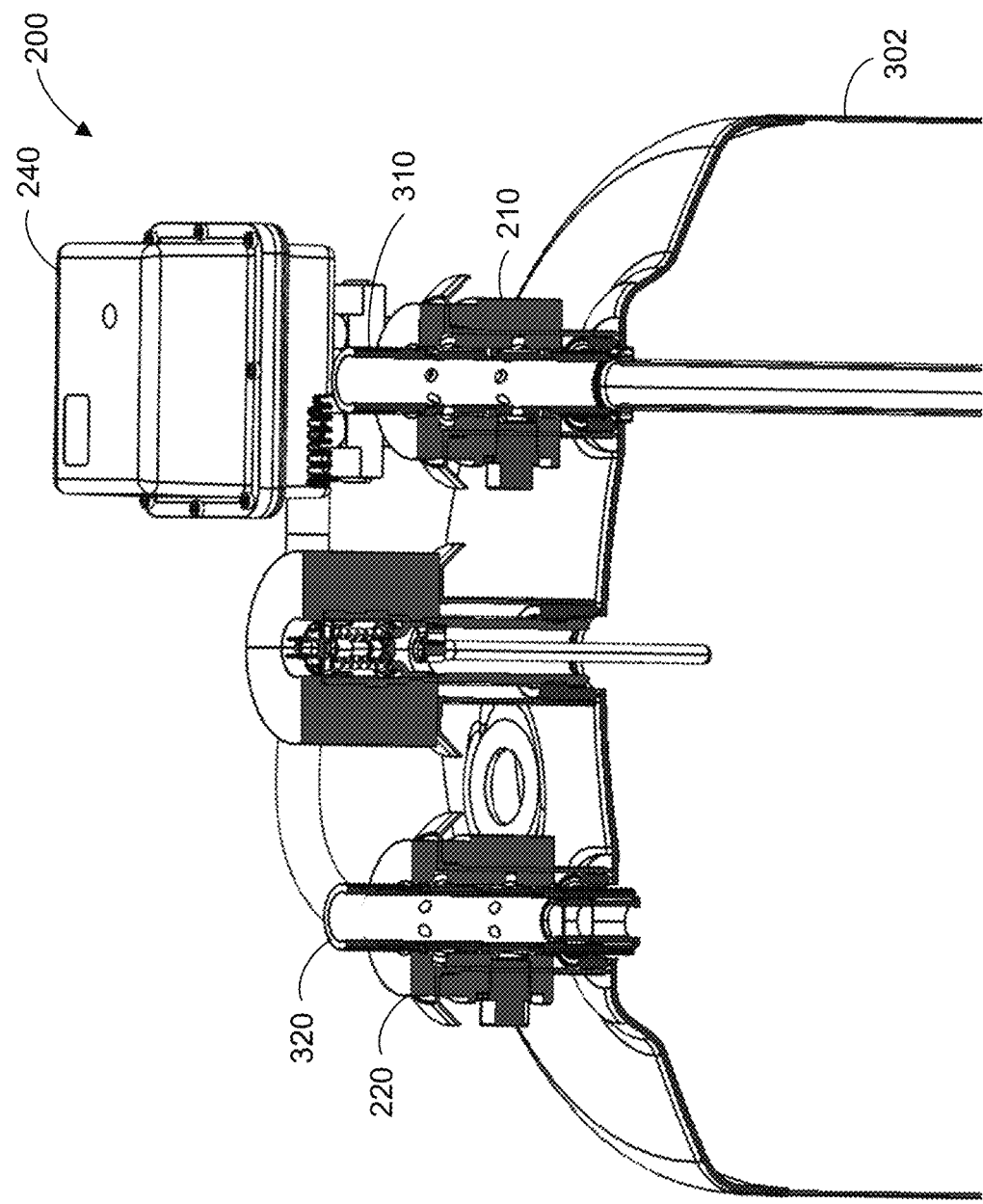
FIG. 17 illustrates a cross-sectional view of an example mixing valve assembly installed on a tank of a water heater unit, in accordance with the disclosed technology.

As can be seen in FIG. 13, the mixing valve assembly 200 can include a controller 250. The controller 250 can include one or more processors 252, memory 254 storing data and/or instructions for operating the mixing valve assembly 200, and/or a transceiver 256 configured to transmit and receive data with other devices and/or components. The memory 254 can have instructed stored thereon that, when executed by the one or more processors 252, causes the one or more processors 252 to output instructions for operating the electronic valve system 260, such as operating the motor 262 and/or valve 264 to transition the valve 264 between a closed configuration and an open configuration. Alternatively or in addition, the controller 250 can be in electronic communication with one or more water heater sensors 358 (e.g., temperature sensor(s)) and can receive sensor data (e.g., indicative of water temperatures measured by the water heater sensor(s) 358); as such, the controller 250 can be configured to make determinations and output instructions based at least in part on the sensor data.

Alternatively or in addition, the controller 250 can be configured to communicate (e.g., via the transceiver 256) with a controller 350 of the water heater (e.g., water heater 300 as described more fully herein). The controller 250 can be configured to receive instructions from the water heater controller 350 and can output instructions to components of the mixing valve assembly in accordance with the instructions from the water heater controller 350. Alternatively, the controller 250 can be omitted, and the water heater controller 350 can be configured to directly control various components of the mixing valve assembly 200 (e.g., the motor 262 and/or the valve 264). The controller 250 (or motor 262/valve 264, if the controller is omitted) can be in wired communication with the various other components, and/or the controller (or motor 262/valve 264 if the controller 250 is omitted) can be in wireless communication with the various other components.

Alternatively or in addition, the controller 250 can be configured to communicate (e.g., via the transceiver 256) with a user device 360, such as a mobile computing device. The controller 250 can be configured to communicate directly with the user device 360 and/or indirectly via a network. The controller 250 can be configured to output data regarding the operational status of the mixing valve assembly 200 (e.g., whether an error or malfunction has been detected), how frequently and/or how much volume of cold water has been mixed with hot water over a given period, and the like.

Referring now to FIGS. 14-18, a water heater 300 can include a tank 302 surrounded by a jacket, which is omitted from FIGS. 14-17 for clarity of illustration. One or more heating elements can be configured to heat water inside the tank 302, and the water heater 300 can include a cold water inlet 310 and a hot water outlet 320. The cold water inlet 310 and hot water outlet 320 can each include a tubular portion, which can be or include a nipple and/or a heat trap. That is, both the cold water inlet 310 and hot water outlet 320 can include a tubular connector extending from the tank 302. Although not necessarily shown in FIGS. 14-18, the tubular portions of the cold water inlet 310 and hot water outlet 320 can include seals 216 (e.g., O-rings) (e.g., as illustrated in FIG. 11) and/or porting threads. The seals 216 can be configured to prevent water leaks from occurring between the cold water connector 210 and the tubular portion of the cold water inlet 310 or between the hot water connector 220 and the hot water outlet 320. (Alternatively or in addition, the seal(s) can be disposed within the through-holes 212, 222 of the cold and/or hot water connectors 210, 220.) The porting threads of either tubular portion can be located one or both ends of the tubular portion. For example, one tubular portion can be configured to attach to (e.g., attached by threaded connections) an aperture of the cold water inlet 310, and another tubular portion can be configured to attach to (e.g., attached by threaded connections) an aperture of the hot water outlet 320. The opposite end of the tubular portion of the cold water inlet 310 can be configured to attach to (e.g., attached by threaded connections) tubing or pipes that are fluidly connected to a cold water source, and the opposite end of the tubular portion of the hot water outlet 320 can be configured to attach to (e.g., attached by threaded connections) tubing or pipes that are fluidly connected to a hot water use location (e.g., a sink).

The cold water inlet 310 and hot water outlet 320 can be located on the same face of the tank 302 and the same face of the water heater 300. As illustrated in FIGS. 14-18, the cold water inlet 310 and hot water outlet 320 can be located on a top surface of the tank 302 (and a top surface of the water heater 300). However, it should be understood that the cold water inlet 310 and hot water outlet 320 can be located on a different surface of the tank 302 or water heater 300 (e.g., a side surface), or the cold water inlet 310 and hot water outlet 320 can be located on different surfaces (e.g., one on top and the other on a side).

The tubular portion of the cold water inlet 310 can include one or more apertures in the tubular portion's sidewall. Likewise, the tubular portion of the hot water outlet 320 can include one or more apertures in the tubular portion's sidewall. For example, as illustrated, the tubular portions of both the cold water inlet 310 and the hot water outlet 320 can include a plurality of apertures, with each aperture having an axis that is in a radial direction with respect to a central axis of the tubular portion. As such, the internal volume of each tubular portion can be in direct fluid communication, via the apertures, with a volume surrounding the tubular portion. When the mixing valve assembly 200 is installed on the water heater 300, the tubular portion of the cold water inlet 310 can be inserted into the through-hole 212 of the cold water connector 210 and the tubular portion of the hot water outlet 320 can be inserted into the through-hole 222 of the hot water connector 220. The through-hole 212 of the cold water connector 210 can be shaped and dimensioned such that a fluid passage is created between the mixing outlet 215 and the internal volume of the tubular portion of the cold water inlet 310 (e.g., via the apertures of the tubular portion and/or an internal volume created between one or more internal surfaces of the cold water connector 210 (e.g., surfaces of the through-hole 212) and one or more external surfaces of the tubular portion of the cold water inlet 310. Likewise, the through-hole 222 of the hot water connector 220 can be shaped and dimensioned such that a fluid passage is created between the mixing inlet 225 and the internal volume of the tubular portion of the hot water outlet 320 (e.g., via the apertures of the tubular portion and/or an internal volume created between one or more internal surfaces of the hot water connector 220 (e.g., surfaces of the through-hole 222) and one or more external surfaces of the tubular portion of the cold water inlet 320.

As will be appreciated by those having skill in the art, the mixing valve assembly 200 can simplify and expedite the manufacture of water heaters having an integrated mixing valve, which can, in turn, reduce the overall cost of the water heaters. For example, one tubular portion can be attached to (e.g., attached by threaded connections) an aperture of the cold water inlet 310, and another tubular portion can be attached to (e.g., attached by threaded connections) an aperture of the hot water outlet 320. This can result in the configuration illustrated in FIG. 14.

The mixing valve assembly 200 can be installed by way of sliding the cold water connector 210 over the tubular portion of the cold water inlet 310 and sliding the hot water connector 220 over the tubular portion of the hot water outlet 320. This can result in the configuration illustrated in FIGS. 15-17.

Figure 18:
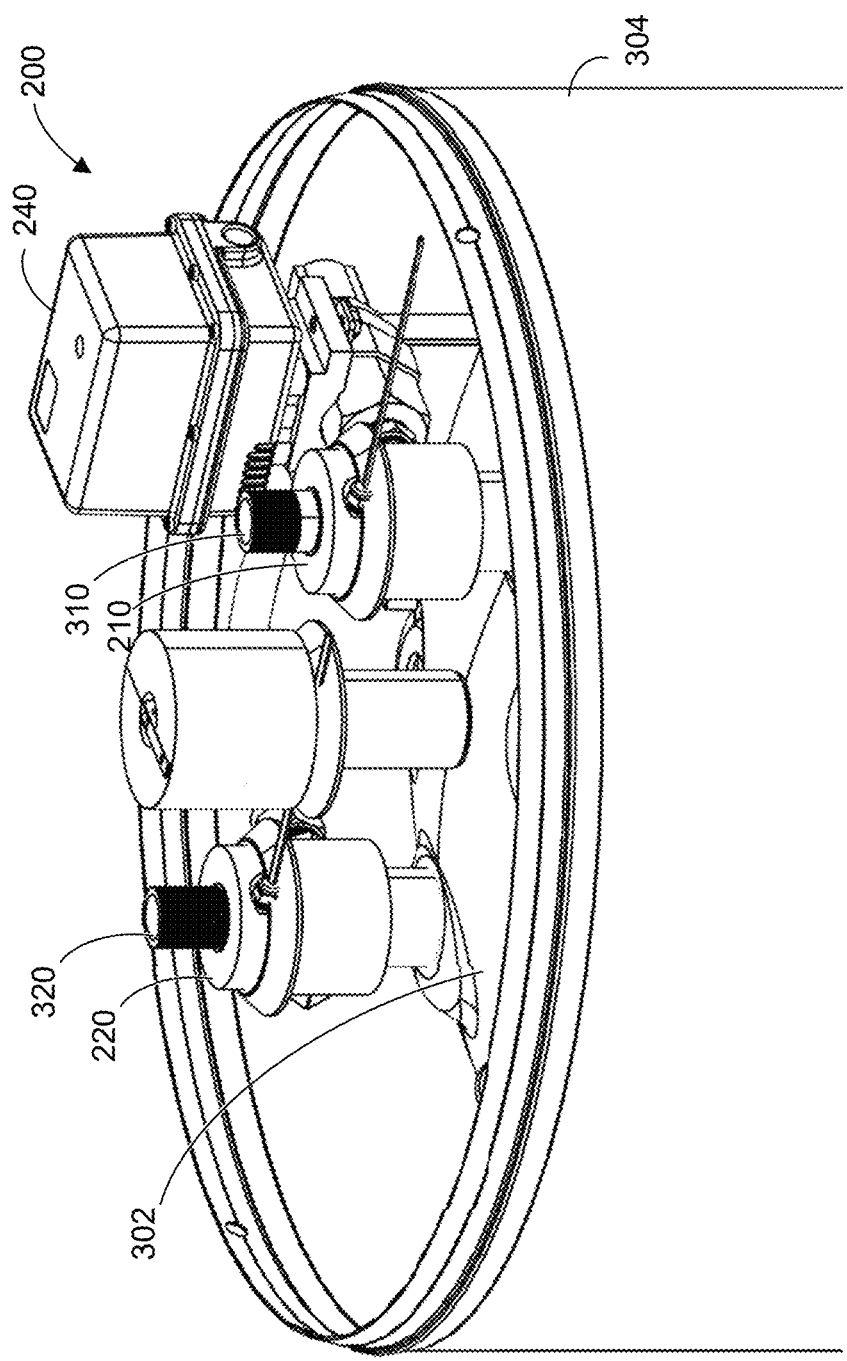
FIG. 18 illustrates an example mixing valve assembly installed on a water heater unit with the top plate omitted for clarity of illustration, in accordance with the disclosed technology.

The jacket 304 of the water heater 300 can be installed around the tank 302 (such as is shown in FIG. 18), and a top pan 306 can be installed at the top of the jacket, thereby enclosing the tank 302 within an outer shell (which includes the jacket 304 and top pan 306) of the water heater 300. This can result in the configuration illustrated in FIGS. 19 and 20. Thus, at least of the mixing valve assembly 200 can be located within the shell of the water heater 300. As shown, a top portion of the cold water connector 210, a top portion of hot water connector 220, and at least some of the housing 240 are shown to be protruding above the top pan 306, and the rest of the mixing valve assembly 200 is located within the shell of the water heater 300. By positioning at least some of the mixing valve assembly 200 inside the shell of the water heater 300, the overall height and size of the water heater 300 can be decreased (e.g., as compared to existing water heaters having traditional mixing valves installed thereon). Optionally, all of the mixing valve assembly 200 except for the housing 240 can be located within the shell of the water heater 300 (e.g., covered by the top pan 306). The housing 240 can enable access to electrical ports and/or circuitry of the mixing valve assembly 200, which can help facilitate easy electrical connection to the water heater 300 and/or an electricity source and/or easy access for maintenance or repairs. Alternatively, the housing 240 can also be located within the shell of the water heater 300 (e.g., covered by the top pan 306); in such a case, the top plate can include an access panel or the like for accessing electrical ports and/or circuitry of the mixing valve assembly 200.

Figure 19:
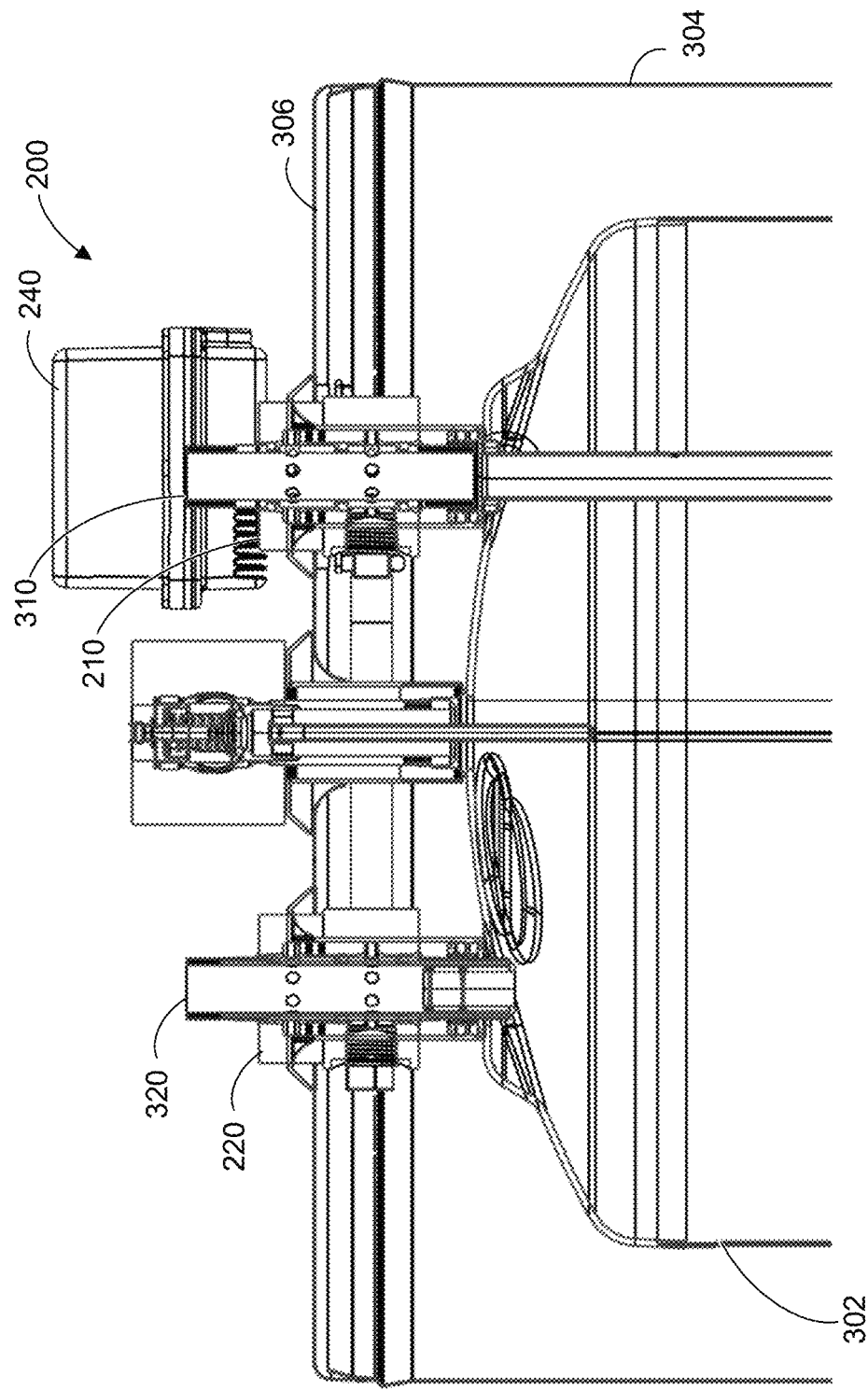
FIG. 19 illustrates a cross-sectional view of an example mixing valve assembly installed on a water heater unit, in accordance with the disclosed technology.
Figure 20:
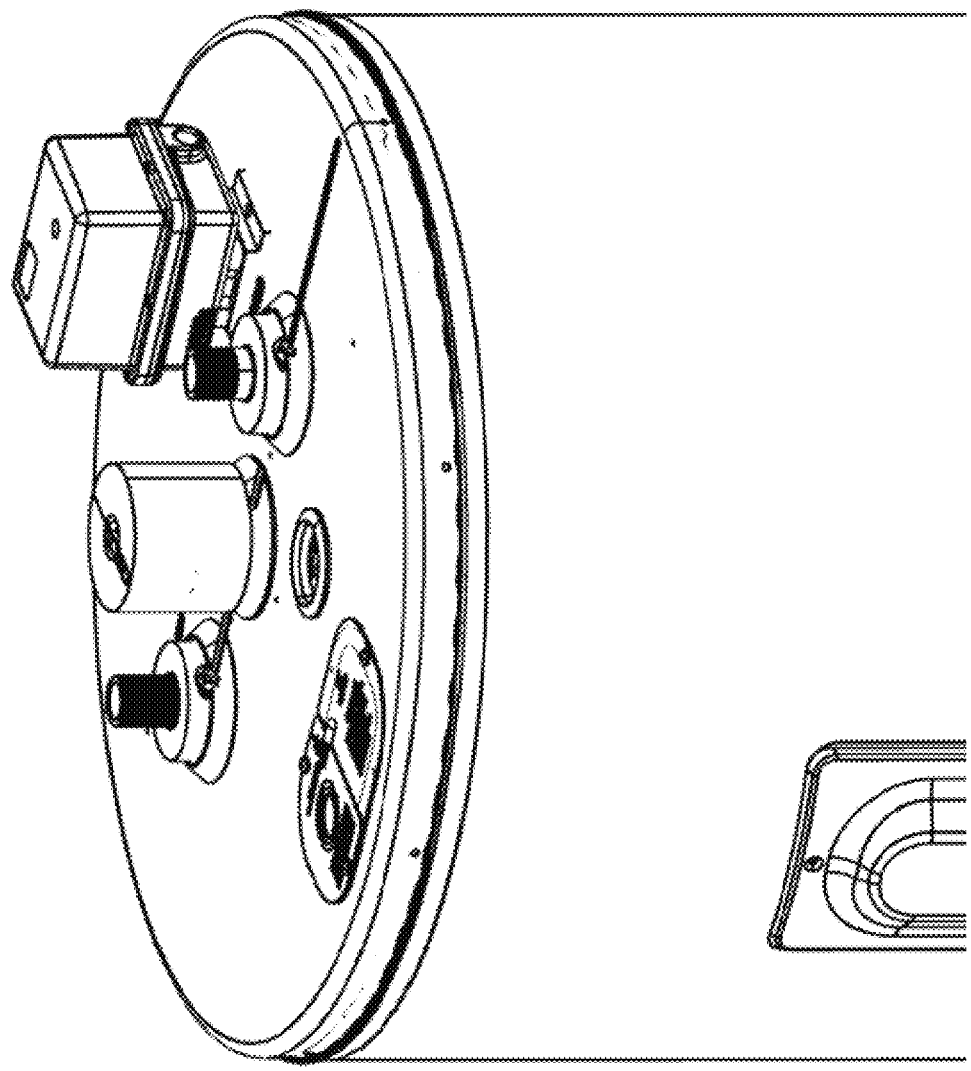
FIG. 20 illustrates an example water heater unit including an example mixing valve assembly, in accordance with the disclosed technology.

As shown in FIGS. 19 and 20, the upper end of the tubular portion of the cold water inlet 310 can protrude from the top plate 306 and can be attached to (e.g., attached by threaded connections) tubing or pipes that are fluidly connected to a cold water source. Likewise, the upper end of the tubular portion of the hot water outlet 320 can protrude from the top plate 306 and can be configured to attach to (e.g., attached by threaded connections) tubing or pipes that are fluidly connected to a hot water use location (e.g., a sink).

Insulation, such as insulative foam, can be inserted or injected in the space between the exterior of the tank 302 and the interior of the jacket. Optionally, the insulation can be an expanding foam. Some or all of the mixing valve assembly 200 can be located within the shell of the water heater 300 and surrounding by insulation. For example, some or all of the hose 230 can be surrounded by insulation (e.g., expanding foam insulation).

The cold water connector 210 and a hot water connector 220 have been discussed to this point as being configured to slideably receive a tubular portion protruding from the tank 302 (e.g., cold water inlet 310 and hot water outlet 320). However, the cold water connector 210 and hot water connector 220 can be alternatively configured such that either has a protruding portion that slideably inserts into a corresponding receiving portion of the tank (e.g., cold water inlet 310 and hot water outlet 320).

Figure 21:
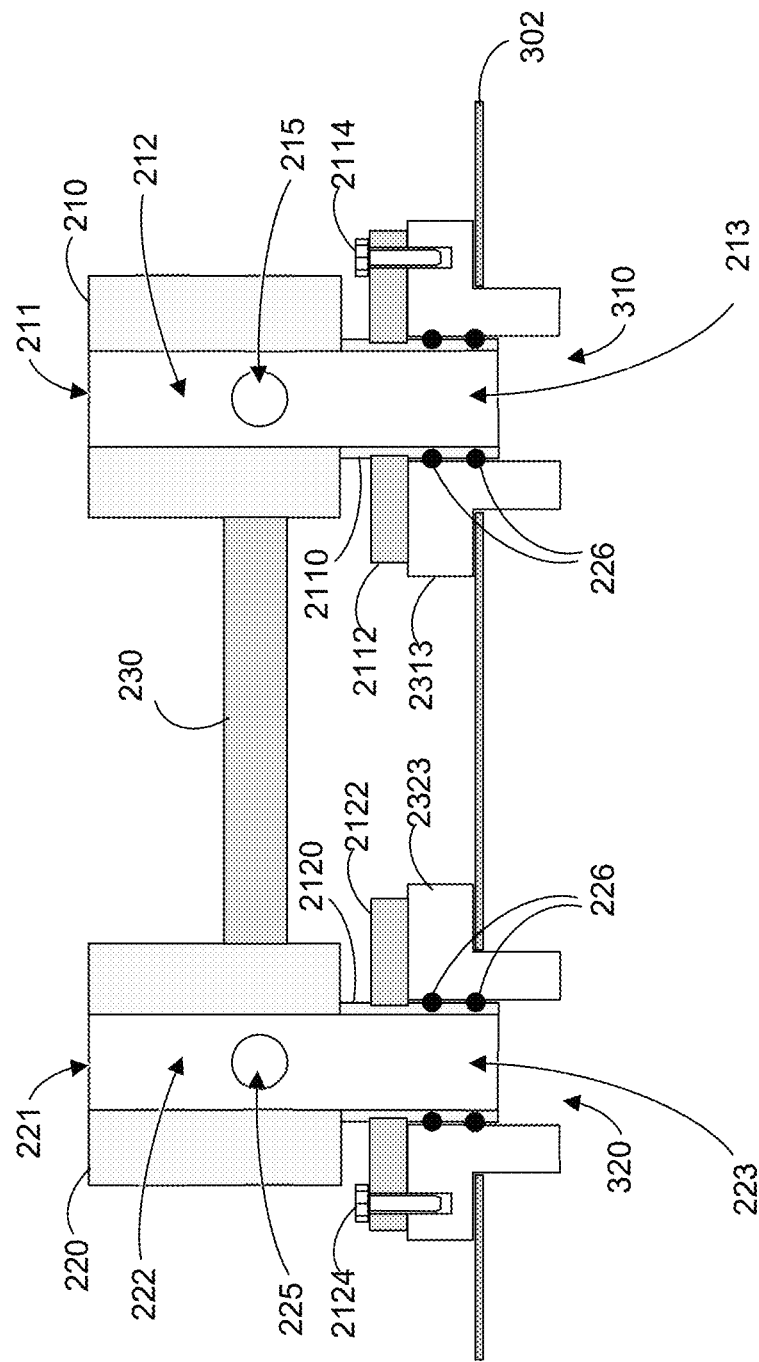
FIG. 21 illustrates a cross-sectional view of an example mixing valve assembly installed on a tank of a water heater unit, in accordance with the disclosed technology.

Referring to FIG. 21, the cold water connector 210 can include a tubular portion 2110 that is configured to slideably insert into a receiving portion of the cold water inlet 310. The cold water connector 210 can include a mount flange 2112, which can be attached to the tubular portion 2110, for example, and the mount flange 2112 can include a through-hole. The through-hole can be threaded. One or more seals 226 (e.g., O-rings) can be positioned on an external surface of the tubular portion 2110.

The cold water inlet 310 of the tank 302 can include a bung 2313, and the bung 2313 can be some or all of the receiving portion of the cold water inlet 310. That is, bung 2313 can be configured to slideably receive the tubular portion 2110. The bung 2313 can include a hole or recess, and the hole of the bung 2313 can be configured to align with the through-hole of the mounting plate 2112 when the tubular portion 2110 is inserted into the bung 2313. The hole of the bung 2313 can be threaded, and the aligned holes of the mounting plate 2112 and bung 2313 can each be configured to receive at least part of a bolt 2114.

Likewise, the hot water connector 220 can include a tubular portion 2120 that is configured to slideably insert into a receiving portion of the hot water outlet 320. The hot water connector 220 can include a mount flange 2122, which can be attached to the tubular portion 2120, for example, and the mount flange 2122 can include a through-hole. The through-hole can be threaded. One or more seals 226 (e.g., O-rings) can be positioned on an external surface of the tubular portion 2120.

The hot water outlet 320 of the tank 302 can include a bung 2323, and the bung 2323 can be some or all of the receiving portion of the hot water outlet 320. That is, bung 2323 can be configured to slideably receive the tubular portion 2120. The bung 2323 can include a hole or recess, and the hole of the bung 2323 can be configured to align with the through-hole of the mounting plate 2122 when the tubular portion 2120 is inserted into the bung 2323. The hole of the bung 2323 can be threaded, and the aligned holes of the mounting plate 2122 and bung 2323 can each be configured to receive at least part of a bolt 2124.

Alternatively or in addition, the holes of the mounting plates 2112, 2122 and bungs 2313, 2323 and the bolts 2114, 2124 can be omitted, and the mounting plates 2112, 2122 can be attached to the respective bungs 2313, 2323 by snap fits, latches, or any other attachment mechanism. Further, although FIG. 21 does not include the housing 240, the configuration depicted and discussed can include the housing 240 and/or any other components discussed herein regarding the mixing valve assembly 200.

As will be appreciated by on having skill in the art, the configuration illustrated in FIG. 21 can remove the need for threaded connections (e.g., at the fluid connection between the cold water connector 210 and the cold water inlet 310 and between the hot water connector 220 and the hot water outlet 320).

While the mixing valve assembly 200 has been discussed herein as having an electronic valve system 260, it is completed that the mixing valve assembly 200 can have a mechanical valve system, such as a valve system including a wax pill thermostatically mixing water.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "one example," "an example," "some examples," "example embodiment," "various examples," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Further, certain methods and processes are described herein. It is contemplated that the disclosed methods and processes can include, but do not necessarily include, all steps discussed herein. That is, methods and processes in accordance with the disclosed technology can include some of the disclosed while omitting others. Moreover, methods and processes in accordance with the disclosed technology can include other steps not expressly described herein.

Throughout the specification and the claims, the following terms take at least the meanings explicitly associated herein, unless otherwise indicated. The term "or" is intended to mean an inclusive "or." Further, the terms "a," "an," and "the" are intended to mean one or more unless specified otherwise or clear from the context to be directed to a singular form. By "comprising," "containing," or "including" it is meant that at least the named element, or method step is present in article or method, but does not exclude the presence of other elements or method steps, even if the other such elements or method steps have the same function as what is named.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An assembly for a water heater, the assembly comprising:
   an outer shell configured to enclose a tank of the water heater, the outer shell comprising:
      a jacket configured to surround the tank; and
      a top pan disposed at a top of the jacket and configured to extend over the tank; and
   a mixing valve assembly disposed at least partially within the outer shell, the mixing valve assembly comprising:
      a cold water connector configured to fluidly connect to a first tubular portion of a cold water inlet of the water heater;
      a hot water connector configured to fluidly connect to a second tubular portion of a hot water outlet of the water heater;
      an electronic valve system configured to transition a valve between an open configuration and a closed configuration; and
      a tube extending between and fluidly connecting the cold water connector and the hot water connector, wherein the tube is disposed within the outer shell and underneath the top pan, and wherein the tube is at least partially surrounded by insulation, wherein:

the cold water connector is disposed at least partially within the outer shell and underneath the top pan, the hot water connector is disposed at least partially within the outer shell and underneath the top pan, a top portion of the cold water connector is disposed outside of the outer shell and above the top pan, and a top portion of the hot water connector is disposed outside of the outer shell and above the top pan.

2. The assembly of claim 1, wherein the valve of the electronic valve system is a solenoid valve.

3. The assembly of claim 1, wherein the electronic valve system comprises a motor configured to transition the valve between the open configuration and the closed configuration.

4. The assembly of claim 1, wherein the electronic valve system is configured to receive instructions from a water heater controller of the water heater.

5. The assembly of claim 1, wherein the tube is non-rigid.

6. The assembly of claim 1, wherein the mixing valve assembly further comprises a check valve configured to prevent backflow of water into the cold water connector.

7. The assembly of claim 1, wherein:

the cold water connector comprises a first through-hole configured to slideably receive at least a portion of the first tubular portion of the cold water inlet of the water heater; and the hot water connector comprises a second through-hole configured to slideably receive at least a portion of the second tubular portion of the hot water outlet of the water heater.

8. The assembly of claim 1, wherein:

a bottom portion of the cold water connector is disposed at least partially within the outer shell and underneath the top pan and is at least partially surrounded by the insulation; and a bottom portion of the hot water connector is disposed at least partially within the outer shell and underneath the top pan and is at least partially surrounded by the insulation.

9. The assembly of claim 1, wherein the mixing valve assembly further comprises a controller configured to output instructions to the electronic valve system.

10. The assembly of claim 9, wherein the controller is further configured to:

receive sensor data from one or more sensors of the water heater; and determine to transition the valve between the open configuration and the closed configuration based at least in part on the sensor data.

11. The assembly of claim 9, wherein the controller is configured to communicate with a water heater controller of the water heater.

12. The assembly of claim 1, wherein:

the cold water connector has a cold water inlet, a tank outlet axially aligned with the cold water inlet of the cold water connector, and a mixing outlet; and the hot water connector has a hot water inlet, a mixing inlet, and an outlet axially aligned with the hot water inlet.

13. The assembly of claim 12, wherein:

a first through-hole of the cold water connector comprises the cold water inlet and the tank outlet of the cold water connector such that the first tubular portion of the cold water inlet of the water heater passes through the cold water inlet and the tank outlet of the cold water connector; and a second through-hole of the hot water connector comprises the hot water inlet and the outlet axially aligned with the hot water inlet such that the second tubular portion of the hot water outlet of the water heater passes through the hot water inlet and the outlet axially aligned with the hot water inlet.

14. An assembly for a water heater, the assembly comprising:

an outer shell configured to enclose a tank of the water heater, the outer shell comprising:

a jacket configured to surround the tank; and a top pan disposed at a top of the jacket and configured to extend over the tank; and a mixing valve assembly disposed at least partially within the outer shell, the mixing valve assembly comprising:

a cold water connector configured to fluidly connect to a first tubular portion of a cold water inlet of the water heater;

a hot water connector configured to fluidly connect to a second tubular portion of a hot water outlet of the water heater;

an electronic valve system configured to transition a valve between an open configuration and a closed configuration; and a tube extending between and fluidly connecting the cold water connector and the hot water connector, wherein the tube is disposed within the outer shell and underneath the top pan, and wherein the tube is at least partially surrounded by insulation, wherein:

the mixing valve assembly further comprises a housing having the electronic valve system at least partially disposed therein, and the housing of the mixing valve assembly is disposed at least partially outside of the outer shell and above the top pan.

15. The assembly of claim 14, wherein the housing has a detachably attachable top portion.

16. The assembly of claim 14, wherein the housing of the mixing valve assembly is fully disposed outside of the outer shell and above the top pan.

17. An assembly for a water heater, the assembly comprising:

an outer shell configured to enclose a tank of the water heater, the outer shell comprising:

a jacket configured to surround the tank; and a top pan disposed at a top of the jacket and configured to extend over the tank; and a mixing valve assembly disposed at least partially within the outer shell, the mixing valve assembly comprising:

a cold water connector configured to fluidly connect to a first tubular portion of a cold water inlet of the water heater;

a hot water connector configured to fluidly connect to a second tubular portion of a hot water outlet of the water heater;

an electronic valve system configured to transition a valve between an open configuration and a closed configuration; and a tube extending between and fluidly connecting the cold water connector and the hot water connector, wherein the tube is disposed within the outer shell and underneath the top pan, and wherein the tube is at least partially surrounded by insulation, wherein:

the mixing valve assembly further comprises a housing having the electronic valve system at least partially disposed therein, the housing of the mixing valve assembly is disposed within the outer shell and underneath the top pan and is at least partially surrounded by the insulation, and the top pan comprises an access panel configured to allow access to a portion of the mixing valve assembly through the top pan.

\* \* \* \* \*